United States Patent [19]

Ichikawa et al.

[11] Patent Number: 4,837,734
[45] Date of Patent: Jun. 6, 1989

[54] METHOD AND APPARATUS FOR MASTER-SLAVE MANIPULATION SUPPLEMENTED BY AUTOMATIC CONTROL BASED ON LEVEL OF OPERATOR SKILL

[75] Inventors: Yoshiaki Ichikawa, Hitachi; Makoto Senoh, Ibaraki; Masanori Suzuki, Hitachi; Hiroshi Kamimura, Hitachi; Fumio Tomizawa, Hitachi; Sakae Sugiyama, Ibaraki; Masayoshi Sasaki, Hitachi, all of Japan

[73] Assignee: Hitachi, Ltd., Tokyo, Japan

[21] Appl. No.: 19,601

[22] Filed: Feb. 26, 1987

[30] Foreign Application Priority Data

Feb. 26, 1986 [JP] Japan .................. 61-39232

[51] Int. Cl.4 .................. G06F 15/46; B25J 9/00
[52] U.S. Cl. .................. 364/513; 364/181; 364/190; 414/1; 414/4; 901/2; 901/4
[58] Field of Search .................. 364/513, 181, 190; 901/3, 4, 8, 2; 434/43, 44, 219, 234, 401; 414/1-6, 909

[56] References Cited

U.S. PATENT DOCUMENTS

| | | | |
|---|---|---|---|
| 3,923,166 | 12/1975 | Fletcher et al. | 901/8 |
| 4,124,944 | 11/1978 | Blair | 434/234 |
| 4,300,198 | 11/1981 | Savini | 364/513 |
| 4,352,664 | 10/1982 | Morrison et al. | 434/44 |
| 4,360,886 | 11/1982 | Kostas et al. | 364/513 |
| 4,484,120 | 11/1984 | Olex et al. | 364/513 |
| 4,518,361 | 5/1985 | Conway | 434/219 |
| 4,573,925 | 3/1986 | Styers | 434/239 |
| 4,657,247 | 4/1987 | Okada | 273/1 E |
| 4,661,032 | 4/1987 | Avai | 364/513 |

FOREIGN PATENT DOCUMENTS

| | | |
|---|---|---|
| 0087981 | 9/1983 | European Pat. Off. |
| 0108348 | 5/1984 | European Pat. Off. |
| 0125776 | 11/1984 | European Pat. Off. |

OTHER PUBLICATIONS

"Advances in a Computer Aided Bilateral Manipulator System," Vertut et al., 1984 Meeting on Robotics and Remote Handling in Hostile Environments, pp. 367-374.

"Language-Aided Robotic Teleoperation System for Advanced Teleoperation," Sato et al., 1985 International Conference on Advanced Robotics, pp. 329-336.

Primary Examiner—Joseph Ruggiero
Attorney, Agent, or Firm—Antonelli, Terry & Wands

[57] ABSTRACT

Remote manipulation method and system of the master-slave type in which an operation procedure plan is prepared for defining each of a sequence of pieces of work as being performed by manual operation or automatic operation at least on the basis of information on the level of skill of a human operator and the sequence of pieces of work is performed in accordance with the plan, whereby work can be done efficiently with human operator's skill taken into consideration.

13 Claims, 29 Drawing Sheets

| | | |
|---|---|---|
| TITLE | | DEMOUNTING OF FLANGE |
| LEVEL | | TASK LEVEL |
| 7a — PRE-CONDITIONS | | ( Free  Flange ) <br> ( On  Flange  Valve body ) |
| 7b — CHANGE OF STATE | DELETION | ( On  Flange  Valve body ) <br><br> ( At  Flange  $\vec{x}b$ , $\vec{\theta}b$ ) |
| | ADDITION | ( On  Flange  Floor ) <br><br> ( At  Flange  $\vec{x}a$ , $\vec{\theta}a$ ) |
| 7c — COST | | DEFINITION OF COST EVALUATION FUNCTION OR VALUE |

FIG. 8D (EXAMPLE OF 8c)

| OPERATOR NUMBER | UPPER LEVEL POINTER | OPERATOR | |
|---|---|---|---|
| 1 | 1 | LOOSEN BOLT | 9a |
| 2 | 1 | REMOVE BOLT | 9b |
| 3 | 2 | MOVE CRANE | |
| 4 | 2 | MOUNT WIRE | |
| 5 | 2 | LIFT UPWARD | |
| | | ⋮ | |

FIG. 8E (EXAMPLE OF 8d)

| OPERATOR NUMBER | UPPER LEVEL POINTER | OPERATOR | | |
|---|---|---|---|---|
| | | ⋮ | | |
| 7 | 2 | approach | bolt | 9c |
| 8 | 2 | grip | bolt | 9d |
| 9 | 2 | rewind | bolt | 9e |
| 10 | 2 | move | $\vec{x}_d$ | 9f |
| | | ⋮ | | |

FIG. 8F ( EXAMPLE OF $8e$ )

| OPERATOR NUMBER | UPPER LEVEL POINTER | OPERATOR | |
|---|---|---|---|
| | | ⋮ | |
| 35 | 7 | ( move  $\vec{x}_1$  : $cond_1$ ) | —10a |
| 36 | 7 | ( move  $\vec{x}_2$  : $cond_2$ ) | —10b |
| 37 | 7 | ( move  $\vec{x}_3$  : $cond_3$ ) | —10c |
| 38 | 7 | ( op-move  $\vec{x}_4$  : $cond_4$ ) | —10d |
| 39 | 8 | ( close-hand  : $cond_5$ ) | —10e |
| 40 | 9 | ( rotate-hand  3600° : $cond_6$ ) | —10f |
| | | ⋮ | |

FIG. 8G ( EXAMPLE OF $cond_i$ )

| NUMBER | | |
|---|---|---|
| | ⋮ | |
| i | gripper attitude $\vec{\theta}$ = ( 30°, 60°, 100°) and gripper posion $\vec{x}$ = ( free, free, 100cm) | —10g |
| | ⋮ | |

FIG. 24

INPUT DATA FOR EVALUATION OF HUMAN OPERATOR'S SKILL

| SYMBOL | TITLE | INPUTTED FROM |
|---|---|---|
| $\vec{x}$ | POSITION | 8TH DATA STORAGE SECTION 207 (SENSED INFORMATION) |
| $\dot{\vec{x}}$ | VELOCITY | |
| $\vec{f}$ | FORCE AND TORQUE | |
| OPN 1 | NUMBER OF OPERATOR CURRENTLY EXECUTED | 6TH DATA STORAGE SECTION 205 (PRESENT STATUS) |
| FLG 1 | FLAG INDICATIVE OF COMPLETION OF EXECUTION | |
| OPN 2 | NUMBER OF OPERATOR TO BE EXECUTED NEXT | |
| $\vec{x_r}$ | VALUE FOR GOAL POSITION | 5TH DATA STORAGE SECTION 204 (PLAN) |
| $\vec{f_r}$ | VALUE FOR GOAL FORCE | |
| Bo | ALLOWANCE FOR POSITIONING | |
| Co | ALLOWANCE FOR TRAJECTORY FOLLOWING | |
| To | REFERENCE EXECUTION TIME | |
| Ao | DISTANCE OF MOVEMENT | |
| Vo | REFERENCE SPEED | |
| Na | NAME OF HUMAN OPERATOR | 1ST DATA STORAGE SECTION 111 |
| Rfa | FATIGUE PARAMETER | |
| Rp | POSITIONING PARAMETER | |
| Rf | FORCE PARAMETER | |
| RR | ROTATION CONTROL PARAMETER | |
| Rt | TRANSFER PARAMETER | |
| Ra | RESPONSE PARAMETER | |

FIG. 25

OUTPUT DATA FOR EVALUATION OF HUMAN OPERATOR'S SKILL

| SYMBOL | TITLE | OUTPUTTED FROM |
|---|---|---|
| Na | NAME OF HUMAN OPERATOR | 1ST DATA STORAGE SECTION 111 (HUMAN OPERATOR'S SKILL DATA) |
| Rfa | FATIGUE PARAMETER | |
| Rp | POSITIONING PARAMETER | |
| Rf | FORCE PARAMETER | |
| RR | ROTATION CONTROL PARAMETER | |
| Rt | TRANSFER PARAMETER | |
| Ra | RESPONSE PARAMETER | |
| $F_R$ | HUMAN OPERATOR'S SKILL UPDATE FLAG | |

FIG. 26

BASIC FORMULA FOR EVALUATION PARAMETERS

| SYMBOL | FORMULA |
|---|---|
| Rfa | $(t - T_o)/T_o$ |
| Rp | $(t - R_a)/(\ln 2 A_o/B_o)$ |
| Rf | $\overline{r_{fi}} \; (r_{fi} = \|\vec{f_r} - \vec{f_i}\|/f_r)$ |
| RR | $\overline{r_{ri}} \; (r_{ri} = \|\vec{x_r} - \vec{x_i}\|)$ |
| Rt | $\overline{r_{ti}} \; (r_{ti} = \dot{x}/V_o)$ |
| Ra | PIECES OF REGRESSION LINE CONCERNING TIME $t$ AND DIFFICULTY $\ln 2A/B$ IN TRAINING |
| ⋮ | |

METHOD AND APPARATUS FOR MASTER-SLAVE MANIPULATION SUPPLEMENTED BY AUTOMATIC CONTROL BASED ON LEVEL OF OPERATOR SKILL

BACKGROUND OF THE INVENTION

The present invention relates to a remote manipulation method using a master manipulator and a slave manipulator and a system using said method.

In the remote manipulation, a human operator operates a master manipulator or a handling lever (to be collectively referred to as a master herebelow) and then a slave manipulator (to be referred to as a slave herebelow) is caused to operate according to the operation of the human operator, thereby achieving an objective job. According to the prior art technology, in many remote manipulation systems, the attitude of the slave follows the attitude of the master so as to transfer the reaction force on the slave to the human operator. Generally, operations are performed by also using a TV camera and a TV display to monitor the slave attitude and the state of work being performed. As described in the "Proceedings of '85 International Conference on Advanced Robotics", pp. 329-336 and the "Proceedings of the 1984 National Topical Meeting on Robotics and Remote Handling in Hostile Environments", pp. 367-374, there exist some systems in which with an input of a command by a human operator, a computer imposes a restriction on a portion of the motion of the slave (for example, to retain the tip of the hand of the slave to be horizontal), thereby aiding a portion of the manual operation.

The conventional technology is attended with difficulties and troublesome operations because the human operator operates the master to indirectly move the slave located at a remote position for performing work. Furthermore, depending on the skill required (degree of dexterity), the efficiency of work (for example, a period of time required for performing a piece of work and the quality of the result of work) is greatly varied.

SUMMARY OF THE INVENTION

It is therefore an object of the invention to provide a remote manipulation method and a system using the same wherein even when human operators having different levels of skill operate the system, the required work can be effectively performed according to the levels of skill of the respective human operators.

According to an aspect of the present invention, an operation procedure matching the level of skill of a human operator is automatically determined and operations which form part of the work are achieved partly through operations of a computer and partly as a result of manual operations of the human operator.

According to another object of the present invention, in working involving remote manipulation using a master and a slave, an operation procedure plan, including combinations of manual and automatic operations, is generated by use of data indicating the level of skill of the operator and a goal for the work to be performed, the automatic operations are automatically performed by a motion management of the computer according to the operation procedure plan, and the manual operations are manually accomplished by the human operator.

According to still another aspect of the present invention, there are provided planning means for generating a procedure mixing manual operations and automatic operations based on skill data indicating a level of skill of a human operator and a goal of the work to be performed, slave managing means for aiding manual operations and performing automatic operations in the automatic operation state, and interface means for effecting management to guide the human operations in the manual operation state for a smooth execution of the work, wherein a plan of operation is first generated and then the operation procedures are sequentially accomplished.

The planning means generates operation procedures by mixing automatic operations and manual operations depending on data indicating the skill of the operator and the goal work supplied thereto. This makes it possible to generate operation procedures for the operators having different levels of skill, thereby developing a high work efficiency. The slave managing means executes automatic operations and aids the operation in the manual operation state. This removes the unnecessary jobs of the operator to proceed the work. The interface means requests the operator's intervention during the manual operation mode and supplies the human operator with feedback information such as a sense of force, which enables the human operator to understand the contents of the operation to be performed and to smoothly accomplish the work.

The initial point of the present invention is the application of the artificial intelligence to the remote manipulation and a division of a part of the work to be controlled by a computer. However, a decision to divide portions of work and operations among the computer and the human operator is a difficult job. As a unique problem, when the remote manipulation is achieved by the human operator, there arises a difficulty in performing an indirect operation of a remote slave while watching the operation on a TV monitor or the like. To perform such a difficult work, the human operator is required to obtain a sense of directions and particular behaviors of the mechanical system and the control system. In the actual manipulation work, the skill greatly varies between the beginner and the experienced operator, namely, it has been found that some operations executed by the experienced operator cannot be achieved by the beginner and that the operation speed and correctness of the same operation also considerably varies between the beginner and the experienced operator. This includes, for example, an operation to grasp a fragile object with an appropriate force, fitting work, a positioning operation, the correctness to align axes, and the time and smoothness in an operation to move the gripper of the slave to a desired, position. Even the experienced operator becomes fatigued in 2 to 3 hours and the level of skill of the operation is at that point greatly decreased.

On the other hand, for the operation conducted by the computer, for example, the positioning of the gripper with a coarse precision can be achieved at a very high speed; however, a long period of time is required to move the gripper while detouring an obstacle and to achieve the positioning with a high precision. Moreover, there exist some operations which can be performed only by the human operator.

The inventors of the present invention have consequently recognized that operations involving remote manipulation may be divided into operations to be accomplished by the human operator, operations to be performed by the computer, and operations to be achieved by both the computer and the human operator depending on the level of skill of the human operator. Based on this recognition, according to the present invention, a plan of operation comprising computer operations, human operations, and cooperative operations of the computer and the human operator is generated by mixing or combining the objects of work and the skill of the human operator, whereby the portion to be executed by the computer is achieved in the automatic operation state; moreover, the portion of the human operations is preferably performed depending on a fundamental principle including an operation request for the human operator. This leads to the most smooth and high-speed remote manipulation.

BRIEF DESCRIPTION OF THE DRAWINGS

FIGS. 8A-8G are schematic diagrams illustrating in detail the 5th data storage section (operation procedure plan) of FIG. 2.

FIGS. 24-26 are explanatory diagrams for explaining parameters.

DESCRIPTION OF THE PREFERRED EMBODIMENTS

Figure 1:
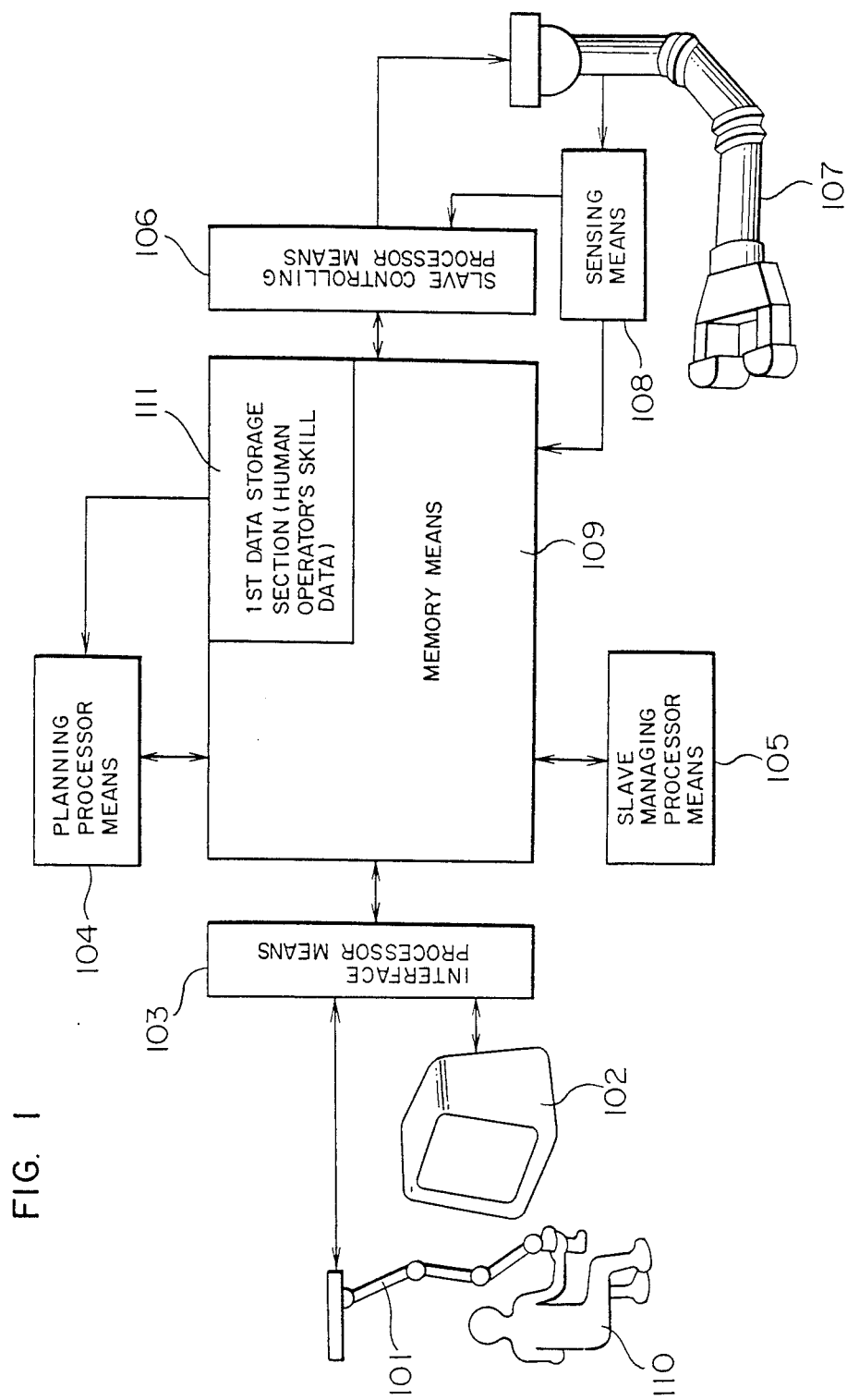
FIGS. 1-2 block diagrams illustrating the overall configuration of an embodiment of the present invention.

An embodiment of the present invention will be described with reference to FIG. 1. This embodiment includes an interface processor 103 connected to a master 101 and a TV monitor 102, a planning processor 104, a slave managing processor 105, a slave controlling processor 106, slave 107 to be controlled by the slave controlling processor 106, a sensing device 108 for sensing the state of the slave 107, a memory means 109 in which information concerning read and write operations are effected by the elements 103, 104, 105, 106, and 108, and a first data storage section 111 disposed in the memory 109 for storing data indicating the operation skill of the human operator, namely, the human operator's skill data.

Figure 2:
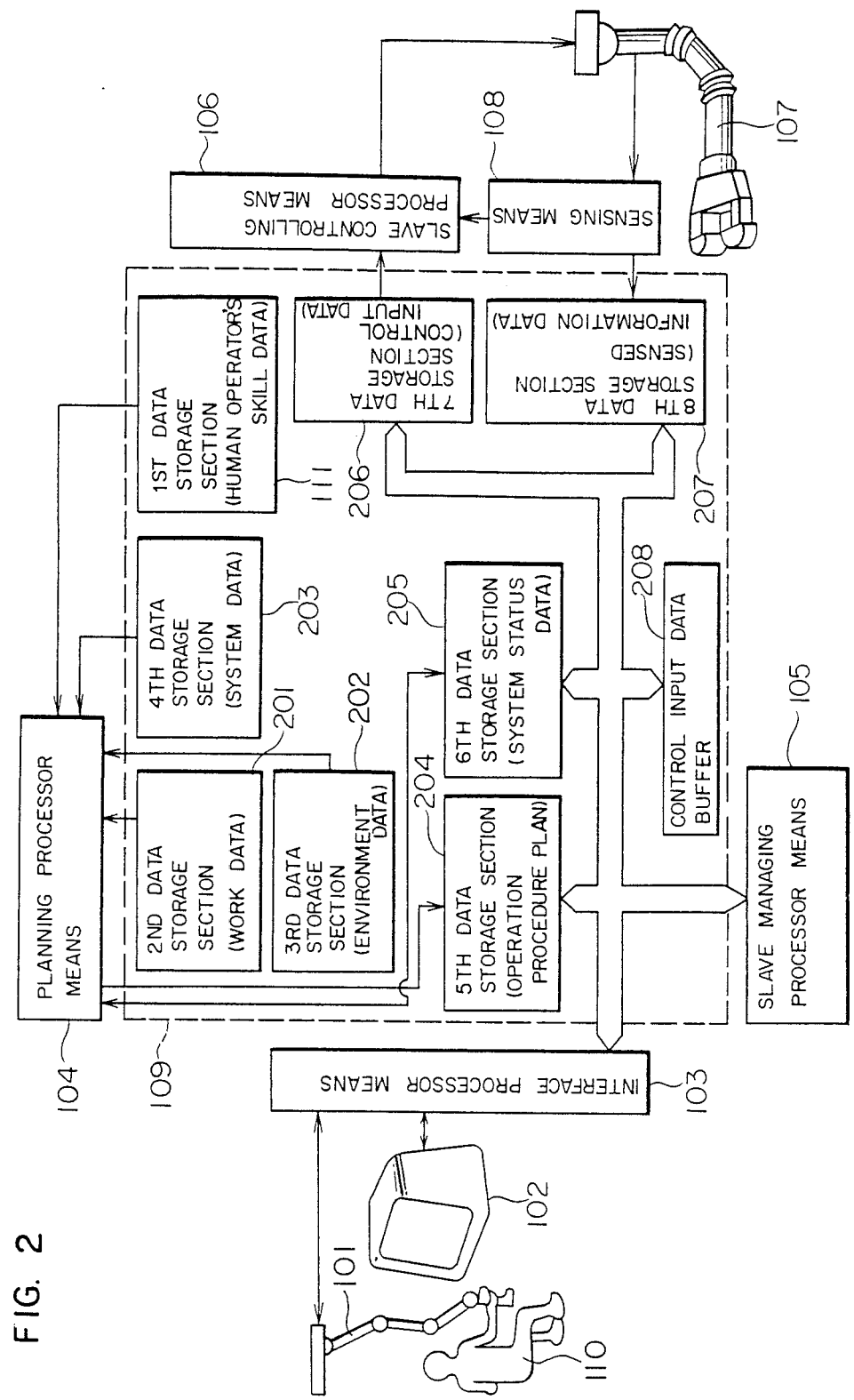

FIG. 2 is a schematic block diagram for explaining the embodiment of FIG. 1 further in detail. In this diagram, the contents of the memory 109 include, in addition to the first data storage section 111, a 2nd data storage section 201 storing work data, a 3rd data storage section 202 storing environment data, a 4th data storage section 203 storing system data, a 5th data storage section 204 storing an operation procedure plan, a 6th data storage section 205 storing system status data, a 7th data storage section 206 storing control input data, and an 8th data storage section 207 storing sensed information data. The blocks of FIG. 2 will be described in the following paragraphs.

<6th data storage section 205>

Figure 3:
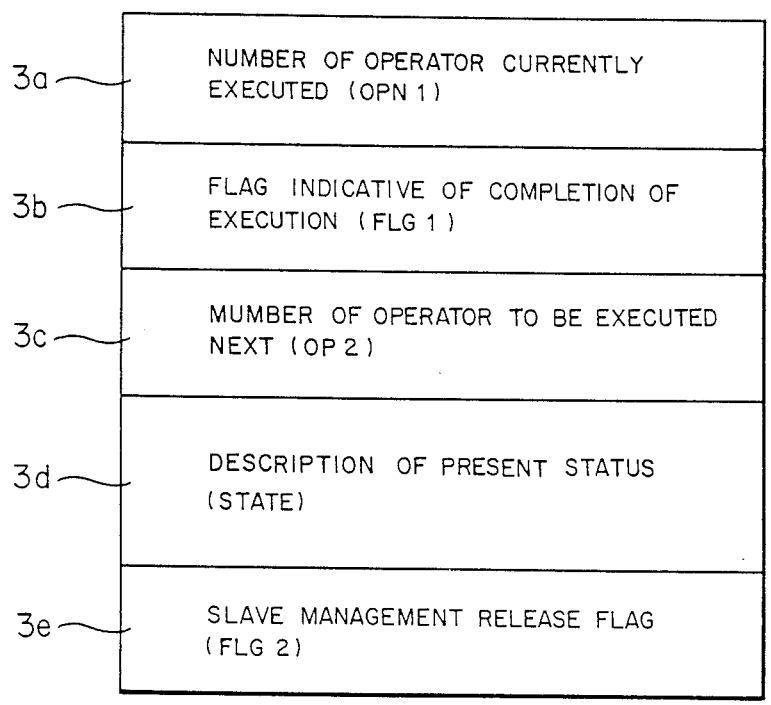
FIG. 3 is a schematic explanatory diagram illustrating in detail the 6th data storage section (status data) of FIG. 2.
Figure 4:
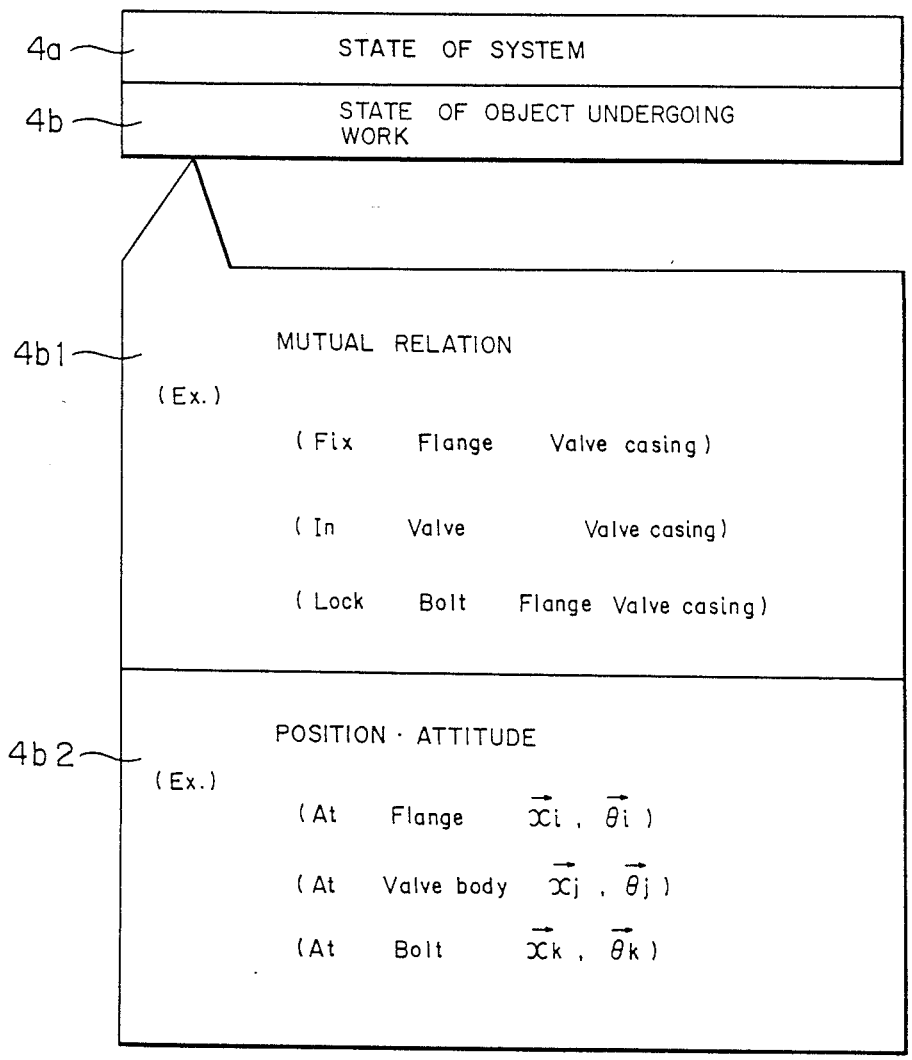
FIG. 4 is an explanatory diagram showing in detail a portion of FIG. 3.

As shown in FIG. 3, the 6th data storage section 205 contains an operator number 3a of an operator currently being executed, a flag 3b indicating the end of execution, an operator number 3c of an operator to be next executed, and a description 3d of the system status. Since the items 3a, 3b, and 3c will be described in detail later in conjunction with the 5th data storage section, the description of system status 3d will be given here. As shown in FIG. 4, the content of the description of system status 3d includes a state of system 4a and a state of the object undergoing work 4b of the master and the slave.

The state of system 4a contains information indicating a joint angle of the master and slave, a position of the gripper, a direction of the gripper, and an information item indicating whether or not the gripper is grasping an object.

The state of the object undergoing work 4b contains a data item 4b1 indicating a mutual relation of the work object and a data item 4b2 indicating a position and an attitude.

Figure 5:
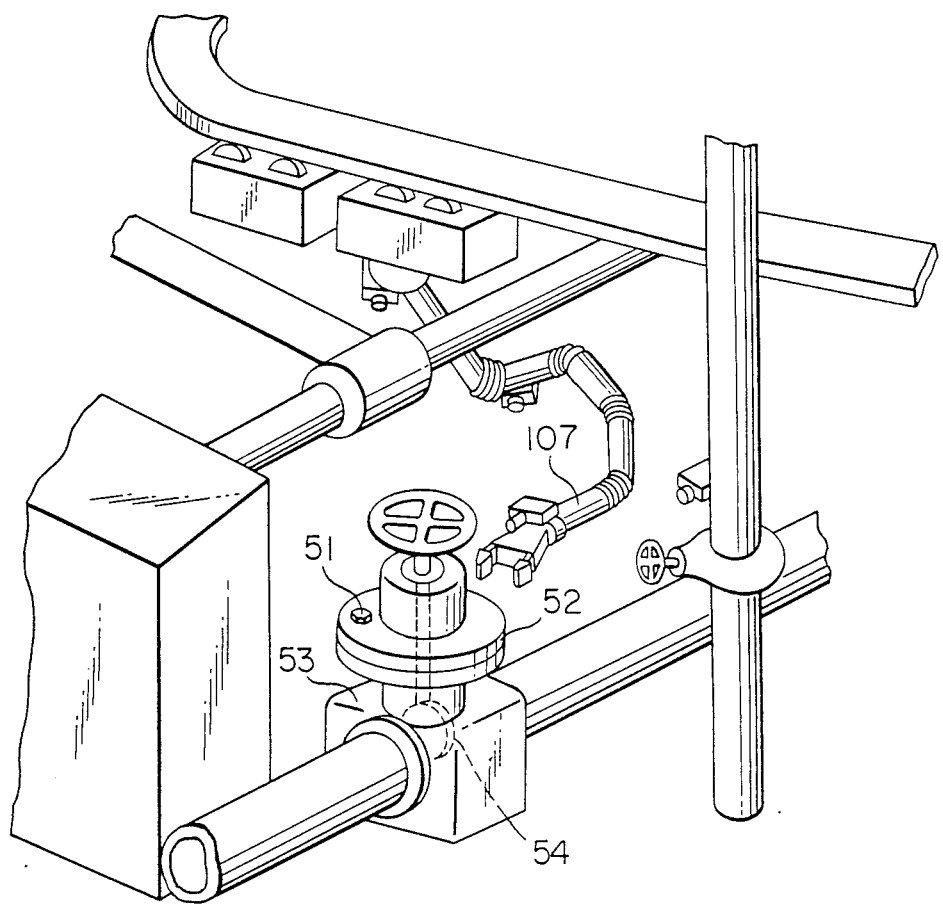
FIG. 5 is a perspective view of an example for explaining the present invention.

Let us assume an example of FIG. 5 for a concrete description of each information. In this example, a valve is disassembled through a manipulation operation, namely, a valve body 54 is taken out from a location inside a flange 52 and a valve casing 53 fixed to each other with a bolt 51. There may be used, for example, 18 bolts; however, only a single bolt is assumed to be used for simplification of description. Referring again to FIG. 4, the description will be given. The information of mutual relation 4b1 describes the state that the flange 52 and the valve casing 53 are fixed to each other, that the valve body 54 is located in the valve casing 53, and that the bolt 51 fixes the flange 52 to the valve casing 53. The information of the position/attitude 4b2 contains position vectors of $\vec{x}_i$, $\vec{x}_j$, and $\vec{x}_R$ of each part in the coordinate system of the space and the attitude angle vector $\vec{\theta}_i$, $\vec{\theta}_j$, and $\vec{\theta}_k$.

<2nd data storage section 201>

Figure 6:
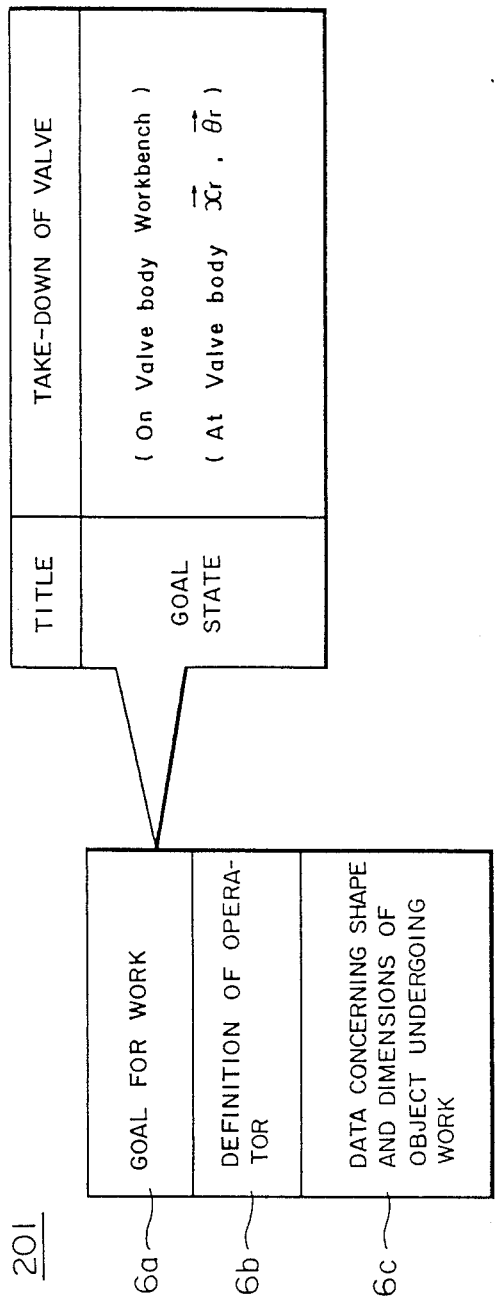
FIGS. 6-7 are explanatory diagrams illustrating in detail the 2nd data storage section (work data) of FIG. 2.

The contents of the 2nd data storage section 201 include a goal for the work 6a, a definition of an operator 6b, and data concerning shape and dimensions of an object undergoing work 6c as shown in FIG. 6. The goal for work 6a defines a target state that the valve body is located on a work stand and that the position and the attitude are represented by $\vec{x}_r$ and $\vec{\theta}_r$, respectively. Moreover, data associated with the shape of the flange and the bolt is contained as data concerning the work object.

Figure 7:
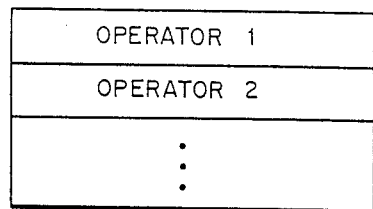

The definition of operator 6b will be described with reference to FIG. 7. An operator is means for changing a state. In order to establish the state of the goal for work (for example, as indicated by 6a of FIG. 6) from the state of object undergoing work (for example, as indicated by 4b of FIG. 4), operations are required to be sequentially achieved by use of appropriate means. The means (operators) are classified into several levels for reasons to be described later. In the example of FIG. 7, a definition is made for a task-level operator, "demounting of flange". Since the description of the level will be given later, the preconditions 7a and the change of state 7b will be here described.

The content of the preconditions 7a indicates conditions under which the pertinent operator is available. In the example of this diagram, the preconditions 7a represents that the flange is not fixed and is located on the valve body. The contents of the change of state 7b are described in two parts, namely, a deletion item and an addition item. The deletion item field indicates items to be deleted from the description of the original state after the operator is effected. In the example of FIG. 7, the item indicating that the flange is located on the valve body and the item related to the position and the attitude of the flange. The addition item field contains items to be added. In the example of the diagram, an item indicating that the flange is located on a floor and an item concerning the new position and attitude of the flange. The cost field 7c contains a value of a cost (to be described later) or a function to be evaluated when this operator is executed.

<3rd data storage section 202>

The 3rd data storage section 202 stores data related to positions, dimensions, and the shape of devices other than the work object and the slave. The data is used to prevent, for example, a collision between the slave and other devices when the slave is caused to operate.

<1st data storage section 111>

The 1st data storage section 111 stores data indicating points or a level for an item representing the skill of the human operator so as to indicate the degree of the skill. The skill items include various data as follows.
(1) Gripper moving time to trajectory accuracy
(2) Gripper positioning time to positioning accuracy
(3) Gripper shaft aligning time to aligning accuracy
(4) Reaction force sensitivity <4th data storage section 203>

The 4th data storage section 203 stores the following data.
(1) Data of dimensions and shape of slave 107
(2) Performance and function of automatic operations by the computer <Sensing means 108 and 8th data storage section 207>

The sensing means 108 includes a TV camera or the like for displaying a scene on the TV monitor 102 used for the automatic operations of an encoder, a potentiometer, a tacho-generator, a force sensor, and a computer disposed for the control of the slave 107 and supplies data to the 8th data storage section 207 storing sensed information data.

The 8th data storage section 208 stores the following information.
(1) Data resulting from various sensing operations
(2) Positions and performances of various sensors, position and characteristics of the TV camera, the camera number of the camera currently displaying a scene on the monitor 102, etc.

<Slave controlling processor means 106 and 7th data storage section 206>

The slave controlling processor means 106 controls the position, the velocity, and the force on each joint of the slave 107. The types and target values for the control are contained in the 7th data storage section 206.

<Planning processor means 104 and 5th data storage section 204>

Figure 8A:
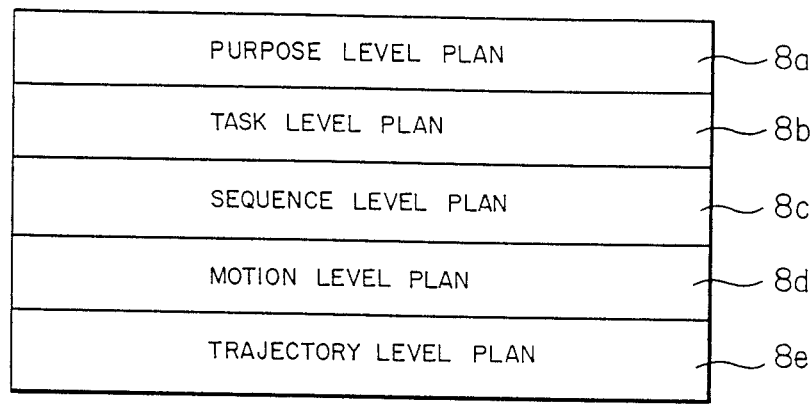
Figure 8B:
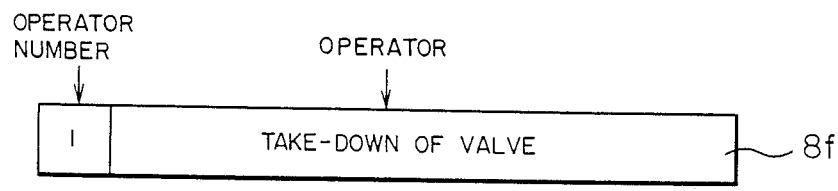
Figure 8C:
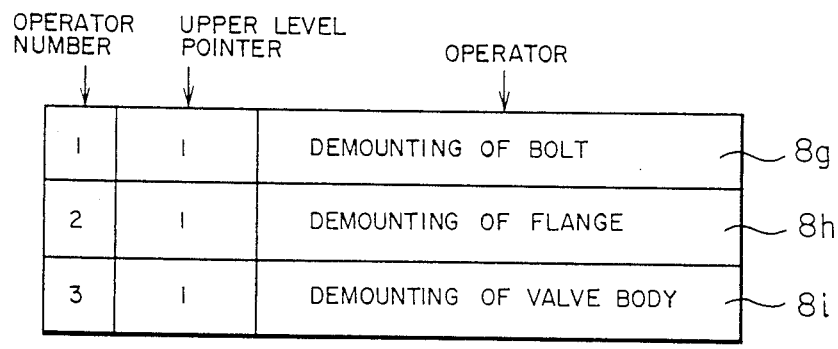

Since a concrete embodiment of the planning processor means 104 will be described later, an outline thereof will be now described. The planning processor means 104 generates a plan of operation procedures by judging the sequence of operators (FIG. 7) necessary to establish the state of the goal for work (for example, 6a of FIG. 6) from the state of the system (for example, 4b of FIG. 4) and stores the results in the 5th data storage section 204. To indicate that the plan of operation procedures has been contained in the 5th data storage section 204, the first number of a plan is stored in the field of the number of the operator to be executed next (3c of FIG. 3) of the 6th data storage section 205. An example is shown in FIG. 8A in which the 5th data storage section 204 stores plans configured in five levels. The plan of each level includes operators defined as shown in FIG. 7. Examples thereof will be illustrated in FIGS. 8A-8G. First, in FIGS. 8A-8B, the plan of the highest level (purpose level plan 8a) comprises only an operator 8f, which represents a concept comprehensively including the overall work. This operator is instantiated with a task level plan 8b (FIG. 8), namely, the procedure is formed as "demounting of bolt" 8g → "demounting of flange" 8h → "demounting of valve body" 8i. In the plan, the operator number field indicates the sequence to execute the operator, and the number in the upper level pointer field indicates the number of the operator which exists in the plan next higher in the level as compared with this plan and from which this item has been created. Namely, in the example of the diagram, three operators of the task level plan 8b of FIG. 8 are generated from the operator No. 1 of the purpose level plan field 8a of FIG. 8B. As the level lowers, the operator becomes more concrete, and at the lowest level, namely, the operator of the trajectory level 8e, the data becomes to be executed by the human operator or the computer. FIGS. 8D-8E are schematic diagrams showing examples of the procedure levels 8c and 8d, respectively. "Demounting of bolt" 8g at the task level 8b in FIG. 8C is divided into "loosen bolt" 9a and "remove bolt" 9b at the sequence level 8c in FIG. 8D. "Loosen bolt" 9a is a task to be conducted by use of a special tool. The lower levels of the "remove bolt" 9b will be described. As shown in FIG. 8E, at the motion level 8d, there are provided concrete items, namely, "approach bolt" 9c, "grip bolt" 9d, "rewind bolt" 9e, and "move $\vec{x}_d$" 9f. These items respectively mean "move the gripper to a position to grasp the bolt", "grip the bolt", "rewind the bolt", and "move the gripper to the position $\vec{x}_d$". Of these operations, the items 9c, 9d, and 9e are instantiated as shown in the example of FIG. 8F. This diagram illustrates the lowest level, namely, the trajectory level 8e. As shown in this diagram, "approach bolt" 9c is made to be concrete as "move $\vec{x}_1$: cond$_1$", "move $\vec{x}_2$: cond$_2$", "move $\vec{x}_3$, cond$_3$", and "op-move $\vec{x}_4$, cond$_4$". This means that in order to move the gripper to the position $\vec{x}_4$ to grip the head of the bolt, the gripper is moved from $\vec{x}_1$ to $\vec{x}_3$ via $\vec{x}_2$ in the automatic mode and is further moved from $\vec{x}_3$ to $\vec{x}_4$ in the manual mode (op move). As described above, the operator associated with the manual operation is, for example, marked with "op-" in its name so as to be discriminated from the operators to be executed in the automatic mode. The symbol such as "cond$_1$" added to an operator indicates an attendant condition to be effected when the operator is executed. The attendant conditions are stored in a separate location, for example, as shown in 10g of FIG. 8G. Field 10g describes the attitude of the gripper, a restriction concerning the position, namely, the manual operation is to be guided by the computer, and other operations. The attendant conditions further include various conditions such as compliance conditions and sensing means to be used. "Op-move" 10d is followed by "close-hand" 10e which is a more specific form of "grip bolt" 9d. The attendant condition, cond$_5$ of this operator includes the descriptions associated with a force to grip the bolt and the like. The next operator "rotate-hand" 10f means that the bolt is rotated ten turns and then is moved. The attendant conditions are described such that as the bolt is made to be looser, the position of the hand is gradually moved according to the compliance control and the attitude of the gripper is kept fixed.

<Slave managing processor means 105>

The operators stored in the 5th data storage section 204 are sequentially executed according to the "number of operator to be executed next" 3c (FIG. 3) contained in the 6th data storage section 205. The operators to be executed are at the trajectory level 8e. In these operations, the slave managing processor means 15 executes the operations depending on the contents of the operators and the attendant conditions. For example, when "move $\vec{x}_1$: cond$_1$" 10a is executed, the means 105 controls the slave 107 via the 7th data storage section 206 so that the gripper reaches the position $\vec{x}_1$ while satisfying the condition indicated by cond$_1$. Furthermore, the processor means 105 judges the end of execution by checking the content of the 8th data storage section 207 and thereby updates the respective items 3a–3d (FIG. 3) of the 6th data storage section 205.

<Interface processor means 103>

If the next operator to be executed is a manual operation, namely, if "op-" is added to the operator, the interface processor means 103 guides the operation of the human operator 110 through a display and a voice output on the monitor 102 and a force generated at the master 101. The interface processor means 103 reads the force applied to the master 101 from the human operator and the change in the force, writes appropriate control input data in the 7th data storage section 206, and reads the sensed information from the 8th data storage section 207 at the same time to generate a reaction force and the like in the master, thereby supplying the feedback information such as the sense of force to the human operator. Moreover, the interface processor means 103 updates the respective items 3a–3d (FIG. 3) of the 6th data storage section 205.

Even for an operator related to the manual operation, the slave managing processor means 105 may function in some cases. This applies to a case where the manual operation is aided, for example, the attendant conditions of the operator impose restrictions on the attitude of the gripper. In such a case, the interface processor means 103 writes data in a control input data buffer 208 of the 1st data storage section 111. This data is read by the slave managing processor means 105, which then writes in the 7th data storage section 206 the control input to which the restrictive condition is added. In this case, the update of the 6th data storage section 205 is accomplished only by the interface processor means 103.

<General flow>

Figure 9:
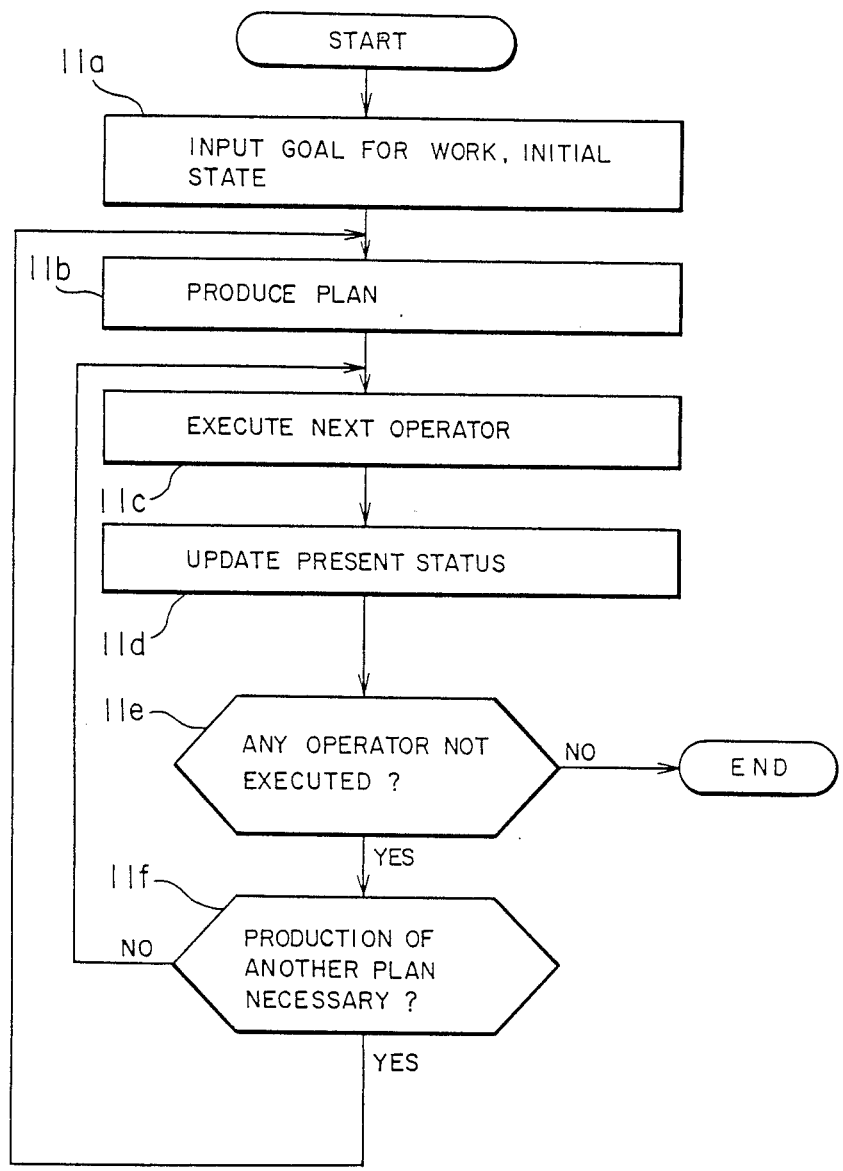
FIG. 9 is a flow chart for explaining the general operation of the embodiment shown in FIGS. 1 and 2.

A description will be given of an outline of the operation procedures of the manipulation system including the block described above (FIG. 2). Assume that the work data excepting the goal for work, the environment data, the system data, and the human operator's skill data are beforehand stored in the 2nd, 3rd, 4th, and 1st data storage sections 201, 202, 203, and 111, respectively. In the flowchart FIG. 9, the initial values are set to the goal for work 6a (FIG. 6) and the 6th data storage section 205 (11a). If "No. 1 of purpose level" is beforehand stored as the initial value in the field of number of operator to be executed next 3c (FIG. 3) in the 6th data storage section 205, since this entry is not an operator at the trajectory level, the system does not execute the automatic operation or the manual operation. If an operator at a level other than the projectory level is stored in the field 3c, the planning processor means 104 is caused to operate, which then further instantiates the plan at the purpose level to generate a plan at the projectory level, stores the generated plan in the 5th data storage section 204, and thereafter sets the number of the trajectory-level operator to be first executed to the field of number of operator to be executed next 3c of the 6th data storage section 205 (11b). When the data at the trajectory level is stored in the field 3c, the interface processor means 103 or the slave managing processor means 105 is caused to function, namely, an operator is executed (11c), the 6th data storage section 205 is updated, a check is effected to determine whether or not an unexecuted operator exists (11d), and the execution is finished if there does not exist such an operator (11e). The unexecuted operator includes not only a projectory-level operator not executed but also such operators at a level higher than the trajectory level and not instantiated to the trajectory level. The means 103 or 105 then selects a number for the next execution from the unexecuted operators and sets the number to the field of number of operator to be executed next 3c, thereby executing the next operator. In this case, if the number written in the field 3c is associated with an operator having a level higher than the trajectory level, the planning processor means 104 initiates the operator, while the processor means 103 or 105 does nothing until the initiation (planning) is completed (11f).

<Detailed description of planning processor means 104>

Figure 10:
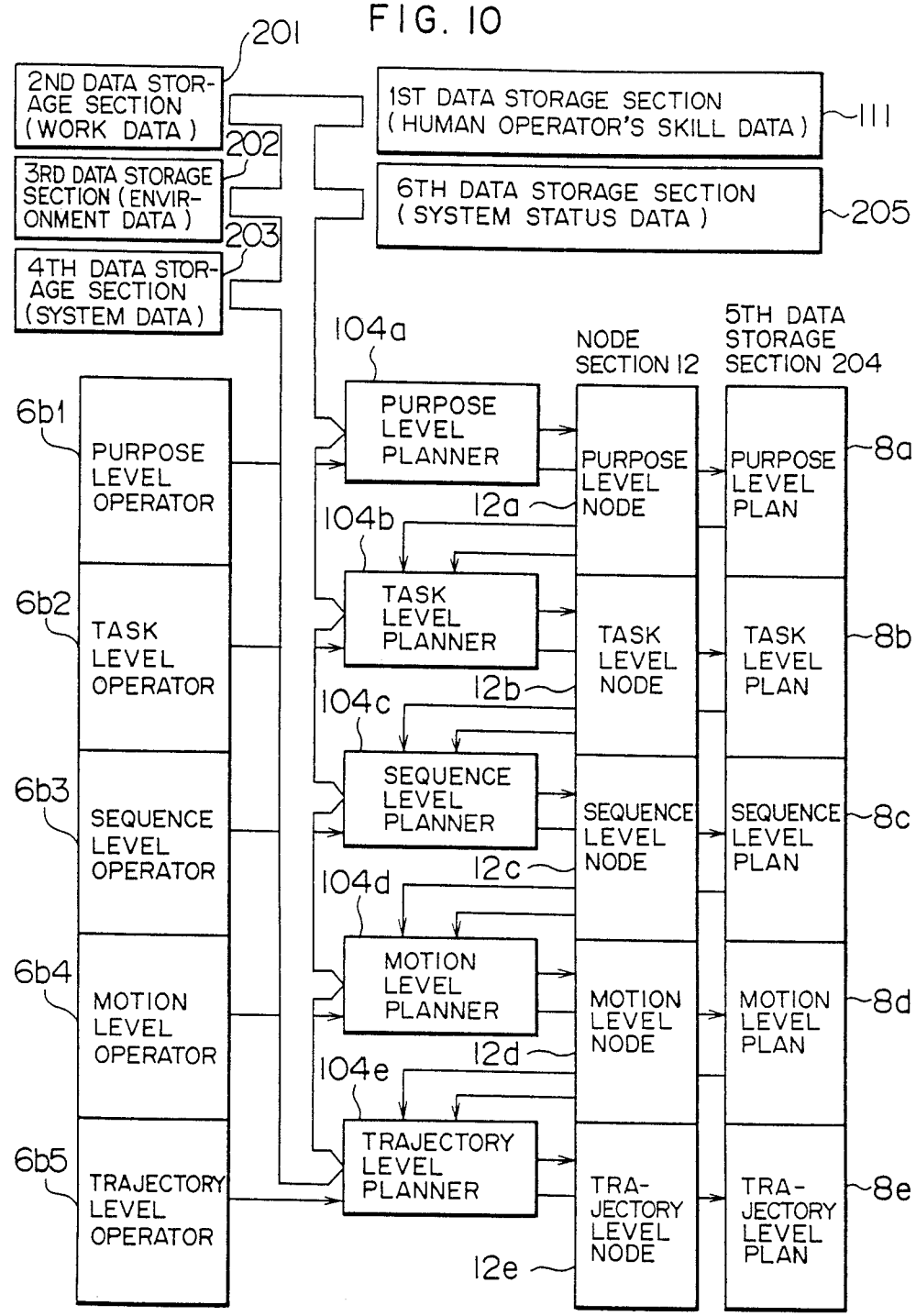
FIG. 10 is a block diagram showing the planning processor means.

Since the function of the planning processor means 104 has already been outlined, the method for realizing the planning processor means 104 will be here described. As already described, when an operator number of an operator having a level higher than the trajectory level is written in the field of operator to be executed next 3, the planning processor means 104 is initiated to instantiate the operator. As a consequence, the planning processor means 104 is structured as shown in FIG. 10 to instantiate operators at the various levels. The processor means 104 further includes planners 104a–104e for the respective levels. Each planner instantiates an operator at a next higher level to obtain a plan of operators at its own level.

FIGS. 8A–8G shows examples in which operators at a level cause to generate more operators as the operators are instantiated to the lower level. Although the operators can be instantiated at a time to the lowest level, namely, the trajectory level, there exists another method in which in the course of the operator instantiation, only the first operator at each level is instantiated. In this case, the other operators are temporarily stored in the fields of the respective levels 8a–84 (FIG. 8) and are later selected as "the number of operator to be executed next" for the instantiation.

The planner at each level fundamentally performs a similar operation. The generation of a plan is a process for determining a sequence of operators to be executed to establish a state of goal from the initial state. Ordinarily, there exist various ways of transition from the initial state to the goal state, namely, the transition is achieved through various intermediate states. The "state" means the description of the system and objects in the form of the example shown in FIG. 4. However, the state here is created hypothetically, and thus not identical to the one in FIG. 4. If a plurality of operators (for which the state A satisfies the precondition field 7a (FIG. 7) can be executed on the state A, the state A is changeable to be another state B, C, or D. Moreover, these states B, C, and D can also be changed to be other states. This makes it possible draw a transition graph in which each state is represented as node. In the graph, there exist two or more paths to reach a goal state, a cost is added to each node, to select a path leading to the goal state at the minimum cost. Such a selection can be implemented by use of a general method called a graph search method. When the path is determined, a list of operators to be executed and a list of states (nodes) changing in sequence are obtained and are then respectively stored in the plan fields of the respective levels 8a—8a of the 5th data storage section 204 and the node sections 12a–12e. When instantiating an operator $\alpha$ stored in the 5th data storage section 204, a node P and a node Q immediately before and after the execution of the operator $\alpha$ are supplied to a planner at a next lower level, which in turn generates a plan by using the node P as the initial state and the node Q as the goal state in the similar fashion. The instantiation of an operator is sequentially achieved as described above.

One of the characteristics of the present invention is a method for evaluating the cost of an operator. For example, assume that when an operator $\beta$ is effected on a node i, the node i is changed to be a node j. In this case, the cost of the node j has a value reflecting the cost of the node i and the cost of the operator $\alpha$. As a consequence, the plan selected as a result of the graph search is a list of operators each with a relatively low cost. Namely, the plan to be generated greatly varies depending on the method for evaluating the cost of each operator. In this embodiment, the cost field 7c (FIG. 7) contains a cost evaluation function in many cases. The cost evaluation function is used to effect a cost evaluation of an operation at the pertinent time and position by use of the data concerning shape and dimensions of an object undergoing work 6c stored in the 2nd data storage section 201, the environment data stored in the 3rd data storage section 202, the system data stored in the 4th data storage section 203, the system status data stored in the 6th data storage section 205, and the human operator's skill data stored in the 2nd data storage section 111. In particular, when evaluating the cost of an operator for the manual operation, namely, an operator having "op-" added to the title thereof, the cost is determined with reference to the human operator's skill data in any case. Consequently, a manual-operation operator which is evaluated for a low cost in a plan when the skill of the human operator is high is changed to be an operator for the automatic operation if the skill of the human operator is low.

Next, a description will be given of the attendant condition 10g (FIG. 8) of an operator at the trajectory level. Some attendant conditions 10g are beforehand specified as definitions for the associated operators and some attendant conditions 10g are determined to minimize the cost of an operator when evaluating the cost thereof. Particularly, in the cost evaluation for an operator to be effected in the manual operation, the attendant conditions greatly influence the cost depending on the skill of the human operator. For example, since the operation to align axes is difficult for the beginner or unexperienced human operator, if an attendant condition is added to generate an appropriate compliance from the visual sensor information, the cost of the operator can be considerably reduced.

<Details of interface processor means 103>

Figure 11:
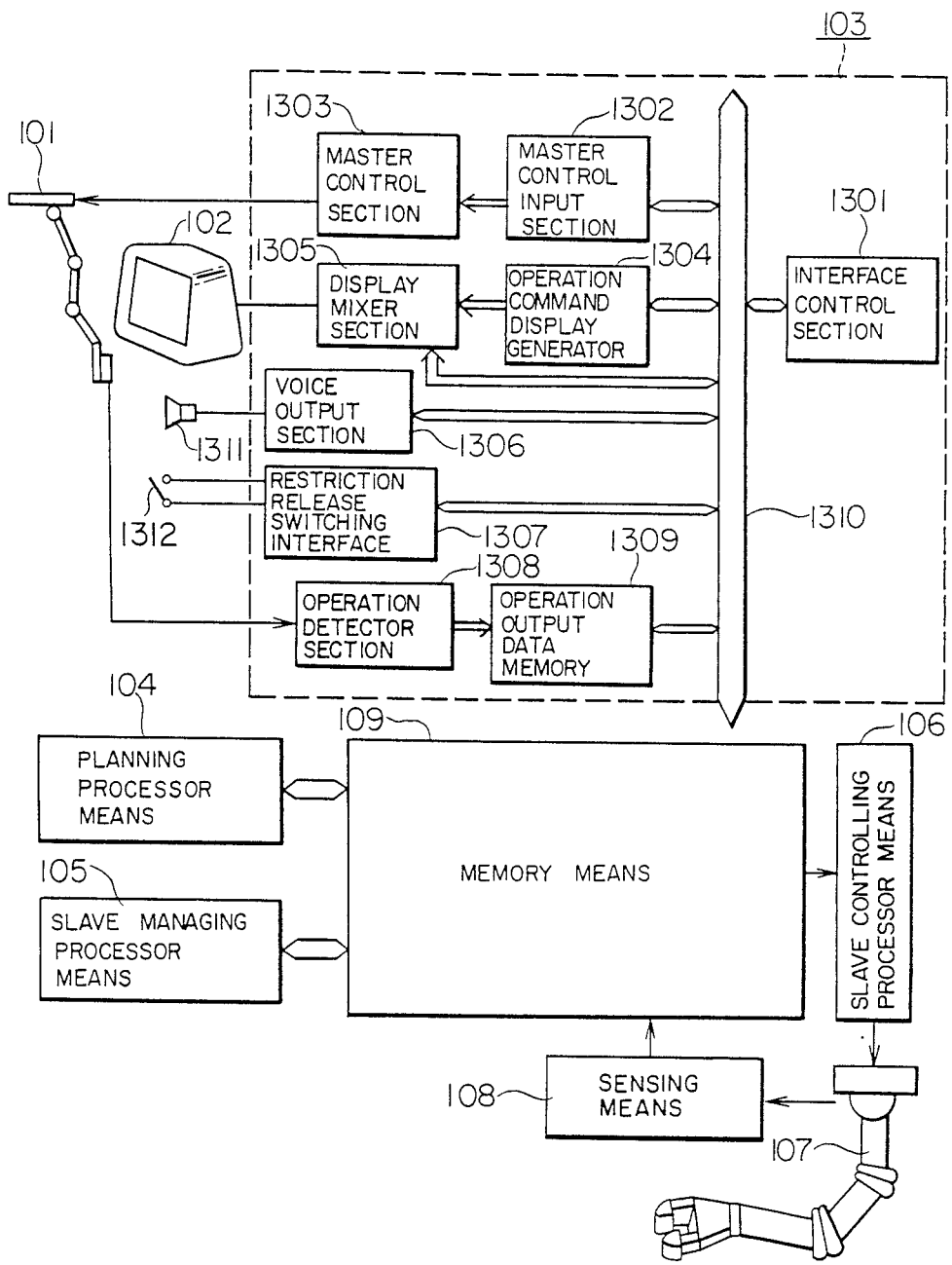
FIGS. 11-12 are schematic diagrams illustrating the block diagram and an operation example of the interface processor means.

The interface processor means 103 will be described in detail with reference to FIG. 11 and subsequent diagrams. FIG. 11 shows the configuration of the interface processor means 103. Each component thereof will be here described. An interface control section 1301 includes a memory, a processor, or the like therein and controls the entire interface processor section 103. A bus 1310 is used to effect a data exchange between the interface control section 1301 and the other components of the interface processor section 103 and the memory means 109. A master control section 1303 controls the master 101 by use of the control data stored in a master control input section 1302. The master control input section 1302 contains the control data to be periodically updated by the interface control section 1301. Based on the content of the operator currently being executed supplied from the interface control section 1301 and the position data of the gripper, an operation command display generator 1304 displays on the TV monitor 102 the contents of work (for example, data 1402–1404 of FIG. 12) and the goal position (for example, the item 1405 of FIG. 12) of the gripper of the slave. In a display mixer section 1305, the CRT display data output from the operation command display generator 1304 to the TV monitor 102 is superimposed onto the TV monitor screen information (the images of the object and the gripper of the slave monitored by the TV camera) stored in the 8th data storage section 207 of the memory means 109 (FIG. 2).

Figure 12:
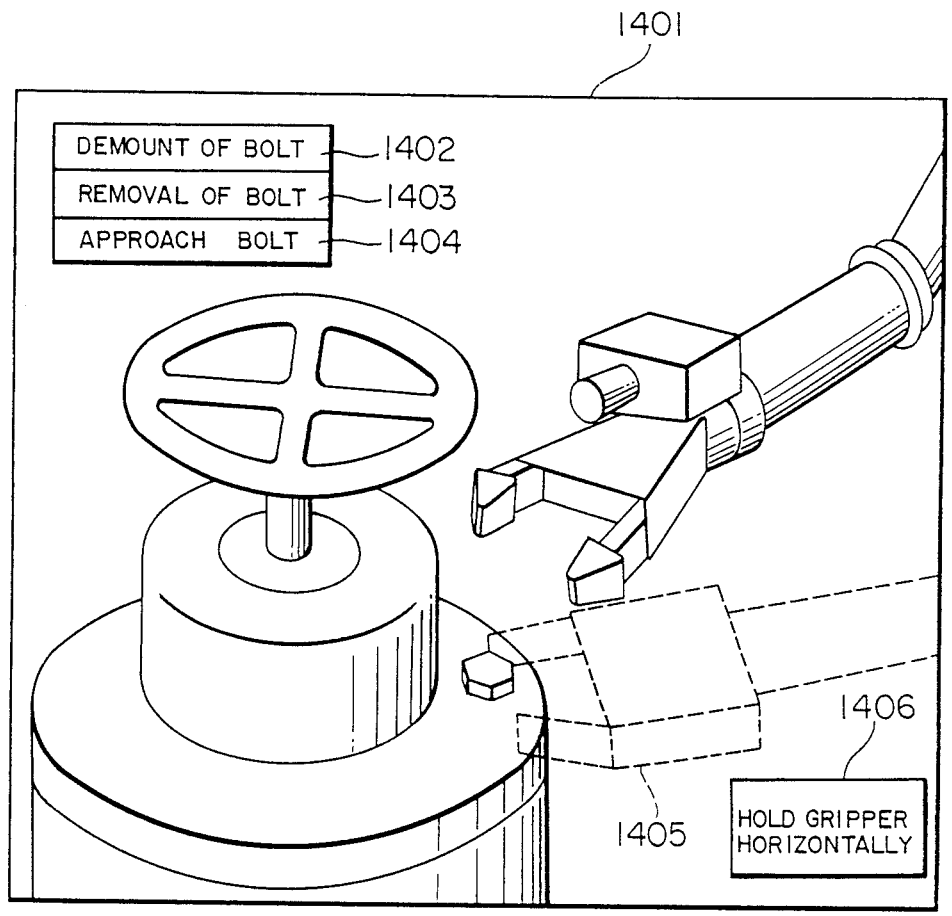

FIG. 12 shows an example of a screen image. The following information items are displayed on the CRT display screen 1401 of the TV monitor 102.

(1) Actual images of the object undergoing work and the gripper of the slave (2) Contents of current task items In this diagram, "demount of bolt", "removal of bolt", and "approach bolt" are displayed in the task, sequence, and motion level operation indicators 1402, 1403, and 1404, respectively.

(3) Graphic display of goal position of the gripper

The goal position of the trajectory-level operator currently in motion is graphically displayed with broken lines in the goal position indicator 1405. The operation of the interface is primarily classified into the automatic and manual operation modes as will be described later. In the automatic operation, the goal position is displayed in the first color, for example, white; whereas, in the manual operation, the goal position is displayed in a second color, for example, red for facilitating the discrimination therebetween.

(4) Attendant conditions

When attendant conditions are added to a manual operation, "hold gripper horizontally" is displayed in the attendant condition indicator field 1406 in the neighborhood of the goal position display.

Returning now to FIG. 11, the description will be given. In response to an indication from the interface control section 1301, a voice output section 1306 causes a speaker 1311 to sound a buzzer tone at the beginning and end of the execution of a new operator at the trajectory level. A synthesized voice generated by a voice synthesis or the like may naturally be available. A restriction release switch 1312 is used by the human operator to release the attendant conditions of the manual operation (for example, the item 1406 of FIG. 14) for some reasons. When the switch 1312 is pressed, an interrupt takes place in the interface control section 1301 via a restriction release switch interface 1307 and then the attendant conditions are released. The method for releasing the attendant conditions will be described later.

An operation detector section 1308 is a sensor including a potentiometer, an encoder, and the like to obtain information such as an angle of each joint of the master when operated by the human operator. An operation output data memory section 1309 stores data from the operation detector section 1308. The interface control section 1301 can fetch the data therefrom through the bus 1310.

Figure 13:
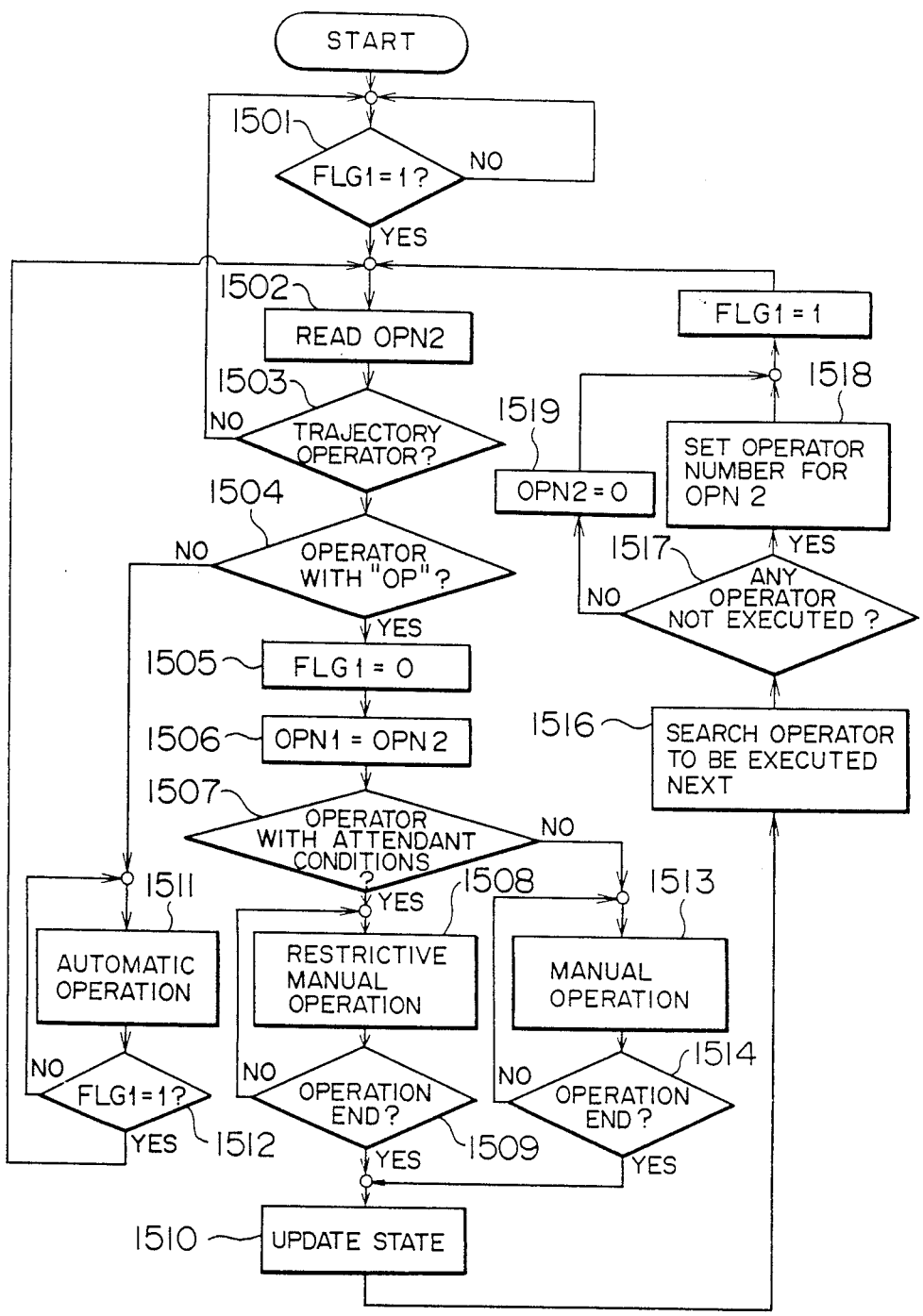
FIGS. 13-17 are flowcharts of processing in the interface processor means.

Referring now to the flowcharts of FIGS. 13–17, the operation of the interface processor means 103 will be described. FIG. 13 shows the general flowchart of control executed by the interface control section 1301. The control is implemented by monitoring the present state in the 6th data storage section 205 of the memory means 109. The symbols appearing in the steps 1501–1519 correspond to the contents of the 6th data storage section 205 of FIG. 3. In this diagram, OPN1, FIG1, OPN2, STATE, and FIG2 are described for the number of operator currently executed (3a of FIG. 3), the flag indicative of completion of execution (3b of FIG. 3), the number of operator to be executed next (3c of FIG. 3), the description of present status (3d of FIG. 3), and the slave management release flag (3e of FIG. 3), respectively. The following description is given by use of these symbols.

First, the flowchart of FIG. 13 will be described. When the power is turned on, the system confirms that the FIG. 1 is set to "1" and then reads the OPN2. If the OPN2 is an operator at the trajectory level, the interface processor means 103 starts its operation. The operation of the interface processor means 103 is primarily classified into the following three modes.

(1) Automatic operation mode (control procedure 1511)
(2) Manual operation mode (control procedure 1513)
(3) Restrictive manual operation mode (control procedure 1508)

The automatic operation mode can be confirmed since the operator in the OPN2 is not assigned with "op-". For example, this applies to the case of the operator of 10a in FIG. 8F. The automatic operation mode is confirmed when an operator with "op-" is found in the OPN2 and the attendant condition, $cond_i$ (FIG. 8G) is not added thereto. The restrictive manual operation mode is confirmed when an operator with "op-" is found in the OPN2 and the attendant condition, $cond_i$ is added thereto.

In the automatic operation mode, the slave 107 is controlled by the slave managing processor means 105. When processing of an operator is completed, the slave managing processor means 105 sets the FIG. 1 to "1". The interface control section 1301 continuously monitors the FIG. 1, and when the FIG. 1 is set to "1", the control procedure 1511 is finished and then the next operator OPN2 is read.

In the manual operation mode and the restrictive manual operation mode, the interface processor means 103 mainly controls the slave 107. In this case, when processing of an operator (OPN1) is finished, the interface control section 1301 updates the description of present status, STATE (1510) and searches an operator to be next executed (1516) according to the definitions of operators as shown in the example of FIG. 7. The search of operators may be effected in the order of numbers assigned thereto if the operators are at the same level (for example, the trajectory level) (FIG. 9); however, if the operators are not at the same level, the field of upper level pointer is referenced to implement the search of operators at the higher level. When all the operators are executed, the tasks are entirely completed. The OPN2 is then set to "0" (1519). Thereafter, the completion flag, FIG. 1 is set to "1" and control is passed to the 6th data storage section 205.

Figure 14:
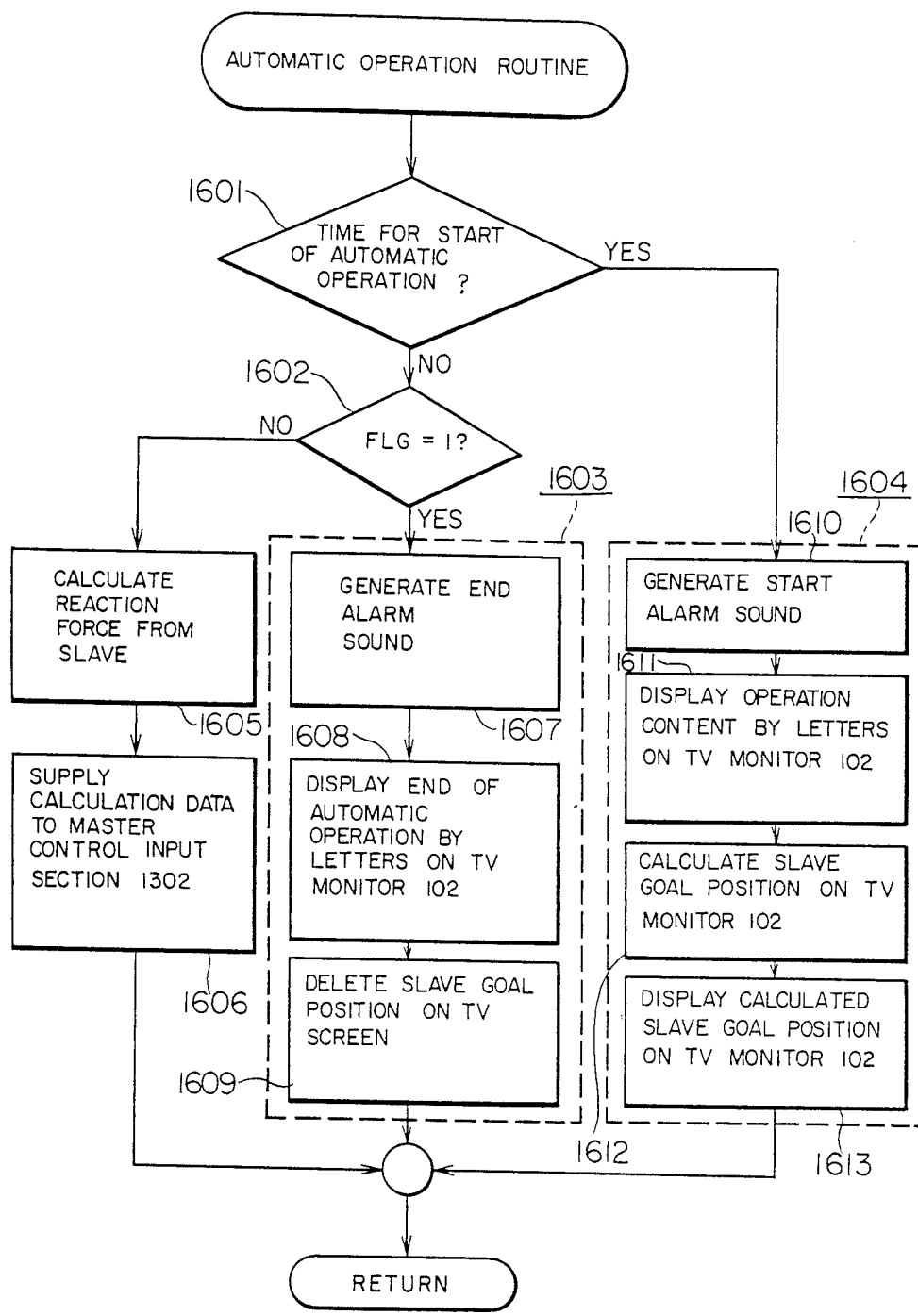

FIG. 14 shows the detailed flowchart of the control procedure 1511 in the automatic operation mode. The control routine of the automatic operation is subdivided into three parts, namely, (1) starting process, (2) operation, and (3) ending process.

In the starting process 1604, the voice output section 1306 causes the speaker 1311 to sound the start tone (1610) to notify the human operator, and then the content of the operation is displayed by letters on the TV monitor 102 (1611). The contents of the display include the contents of the task, sequence, and motion levels of the task currently executed and can be recognized by referencing the system status data in the 6th data storage section 205 and the operation procedure in the 5th data storage section 204. Furthermore, by use of the contents of the trajectory-level operator of the OPN1 and the position information of camera in the 8th data storage section 207, the goal position of the gripper of the slave in the TV monitor screen is calculated and is then displayed on the TV monitor screen (1612, 1613). The display data is generated by the operation command display generator 1304 and is then mixed with the image from the camera in the display mixer section 1305, and the resultant data is displayed on the TV monitor 102.

In the ending process 1603, the end of operator processing is displayed and then the slave goal position is erased from the TV screen. Immediately before the erasure, the image of the slave gripper is matched with the goal position.

In the steps 1605 and 1606, the reaction force from the slave is calculated by use of data in the 8th data storage section 207 and is delivered to the master control input section 1302. This enables the master control input section 1302 to control the master and thereby to transfer information such as the sense of slave gripper to the human operator.

Figure 15:
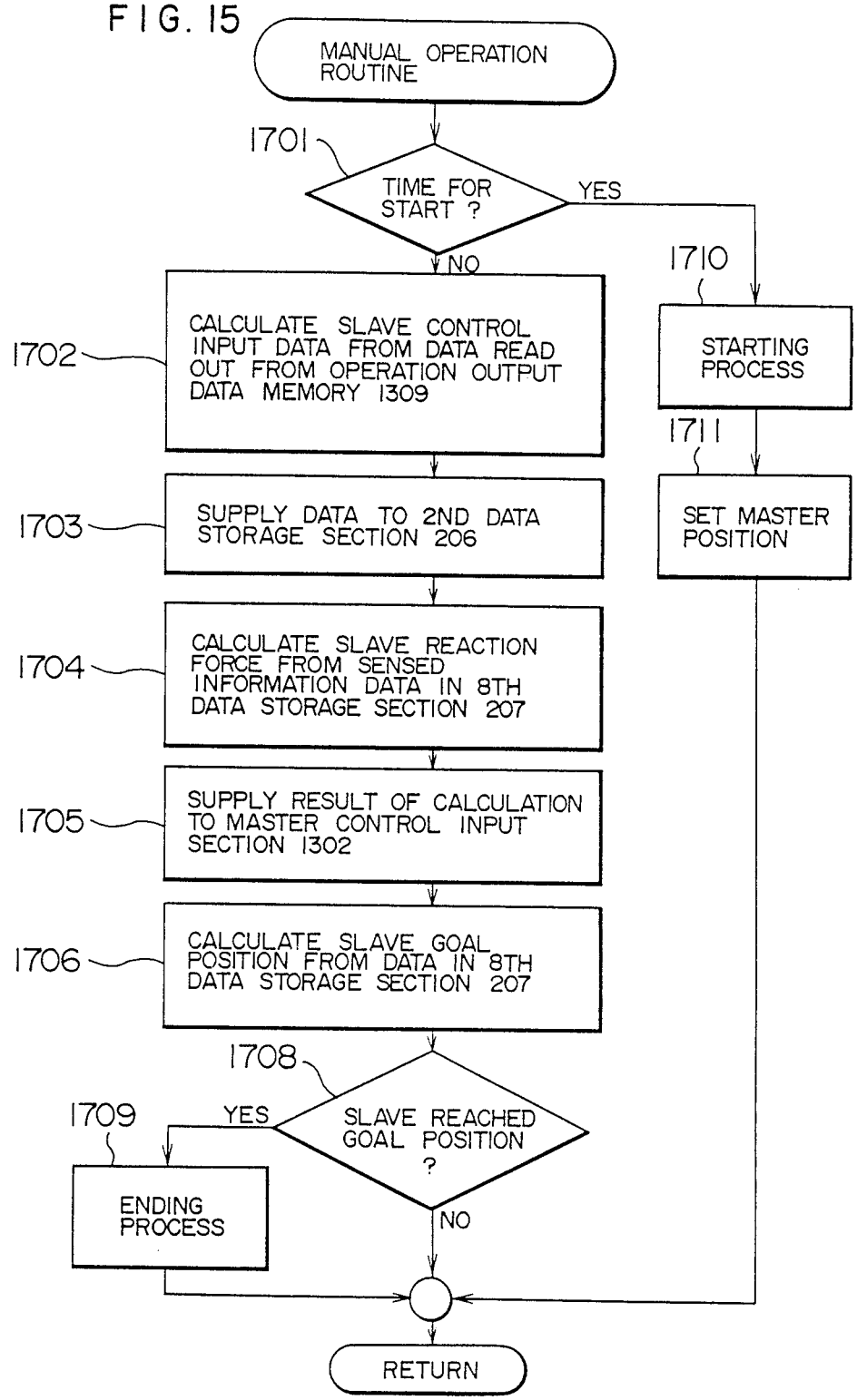

FIG. 15 is the detailed flowchart of the control procedure 1513 in the manual operation mode. The start process 1710 is the same as the process 1604 of FIG. 16, whereas the end process 1709 is the same as the process 1603 of FIG. 16. In the start process 1710, however, the color of the (graphic) display of the slave goal position is different from the color used for the automatic operation to arouse the attention of the human operator.

In the manual operation mode, the slave is controlled according to the operation of the master (1702, 1703); moreover, the reaction force from the slave is calculated, the master is actuated (1704, 1705), and thereby imparting the sense of the gripper to the human operator. In addition, based on the sensed information stored in the 8th data storage section 207, the slave position is calculated (1706) and then a judgement is made to determine whether or not the slave has reached the goal position.

Figure 16:
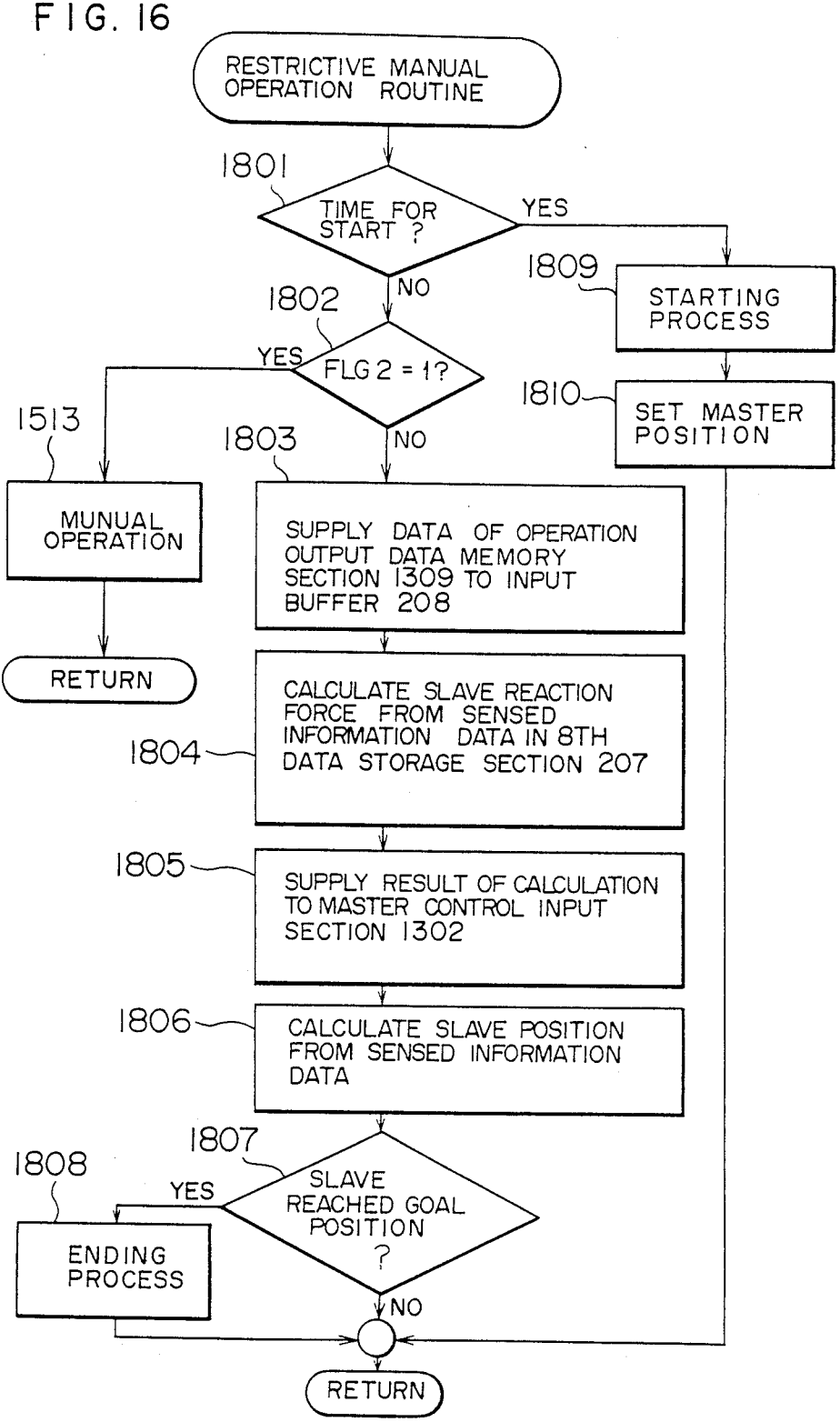

FIG. 16 is the flowchart showing in detail the control procedure 1508 in the restrictive manual operation mode. The start process 1809 is the same as the process 1710, whereas the end process 1808 is the same as the process 1709. In the start process of the restrictive manual operation, however, the attendant condition display 1406 (refer to the example of FIG. 12 for details) is required to be effected. In the restrictive manual operation, the slave is controlled also by the slave managing processor means 105, namely, the control of the restrictive motion such as "hold gripper horizontally" is achieved by the slave managing processor means 105. That is, in the manual operation, the slave control input is calculated from the data in the operation output data memory 1309 and is delivered to the control input section 206; whereas, in the restrictive manual operation, the data in the operation output data memory 1309 is not processed, namely, the pertinent data is directly fed to the control input buffer 208 (in the memory means 109). In this case, by use of the data in the control input buffer 208, the slave managing processor means 105 calculates the data for the control input section 206 under the attendant conditions. Consequently, in the calculation 1804 of the reaction force from the slave, a positional deviation may arise between the master moved by the human operator and the slave moved under the attendant conditions; and hence a weak force is generated to move the master so as to minimize the deviation. This allows the human operator to smoothly conduct the job.

Figure 17:
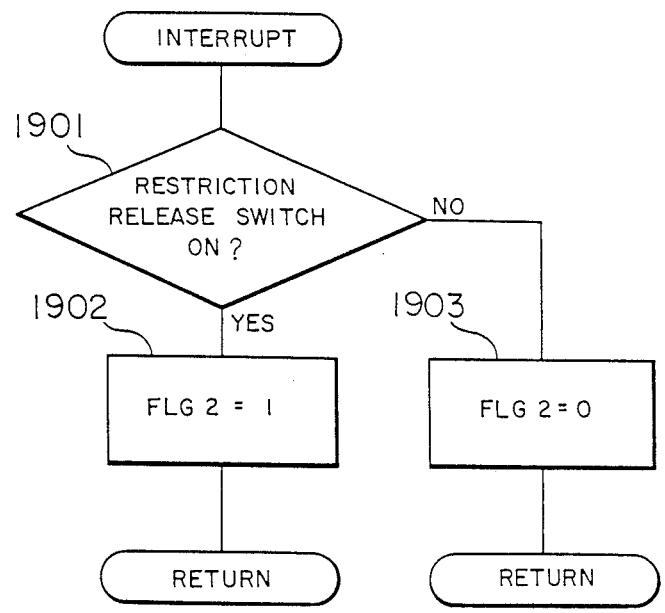

Finally, a description will be given of a case where the monitor is caused in the manual operation mode by releasing the attendant conditions. As described above, an interrupt occurs when the human operator turns the restriction release switch 1312 or and off. FIG. 17 is the flowchart (control procedure 1901-1903) of the interrupt routine of the interface control section 1301. When the FIG. 2 is set to "1" (1902), the slave managing processor means 105 can recognize that the control under the attendant conditions may be stopped. In FIG. 16, the restrictive manual operation is simultaneously changed over to the manual operation by the control procedure 1802.

<Detailed description of slave managing processor means 105>

Figure 18:
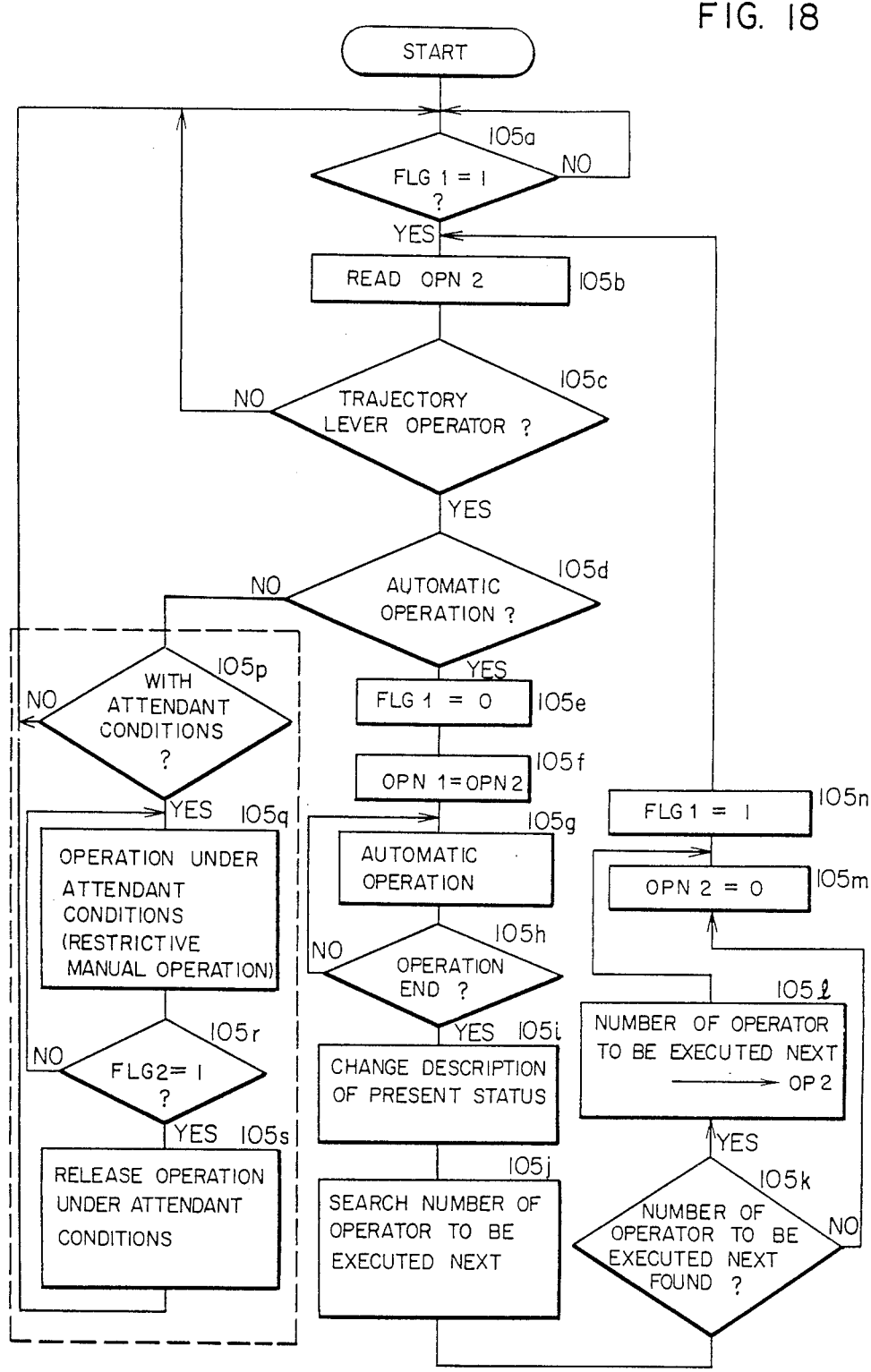
FIGS. 18-19 are flowcharts of the slave managing processor means.

The detailed embodiment of the slave managing processor means 105 shown in FIGS. 1-2 will be described with reference to FIG. 18.

The slave managing processor means 105 continuously monitors (processing block 105a) the completion flag, FLG 1 indicating the completion of the execution stored in the 6th data storage section 205 and the wait state is continued until the execution completion flag of the trajectory level is set to "1". When an execution at the trajectory level is completed (FLG1=1), the number of operation to be next executed (OPN2) is read (processing block 105b) and the number is checked whether or not the number is associated with an operator at the trajectory level (processing block 105c). If the operator is at the trajectory level, and the operation is judged whether or not the operation is in the automatic or manual mode (processing block 105d). If the automatic operation mode is assumed, the execution completion flag is set to "0" and at the same time, the number of the operator to be next executed is set to replace the number of the operator currently executed (processing blocks 105e–105f). In the automatic operation (processing block 105g), the automatic operation of the gripper at the trajectory level is achieved as indicated by the number fields 35–37 of FIG. 8F (the example of FIG. 8e), namely under the restrictive conditions, position vectors $\bar{x}_1$–$\bar{x}_3$ represented like 3-dimensional vectors are output as goal values to the 7th data storage section 206. In the automatic operation, the end of operation is judged as follows (processing block 105h). Based on the sensed information obtained by the sensing means 108 and stored in the 8th data storage section 207, the current position of the gripper is checked to see whether or not the gripper position matches with the position vectors specified as the goal values.

When the automatic operation is finished, the description of the present status, STATE is updated (processing block 105i) in the similar manner described in conjunction with the detailed description of the interface processor means 103. Moreover, the number of the operator to be next executed is searched (processing block 105j) to determine whether or not there exists a number of operator to be next executed (processing block 105k). If such an operator number is found, the number is stored in the OPN2; otherwise, the OPN2 is set to "0", the execution completion flag, FLGN1 is set to "1" (processing blocks 105l, 105m, 105n), and control proceeds to execution of the next processing.

On the other hand, if the operator is associated with the manual operation in the processing block 105d, the operation is checked to see whether or not the operation has attendant conditions to fix the direction of the gripper or the speed of the gripper (processing block 105p). If the operation has the attendant conditions, the operation under the attendant conditions is continued until the interface processor means 103 outputs an indication to release the operation under the restrictive conditions (processing block 105q, 105r, 105s). Provision of the restrictive operation release flag, FLNG2 enables the human operator of the master to release the attendant conditions for some reasons in the restrictive manual operation which has been attempted, thereby supporting a flexible operation of the system.

Figure 19:
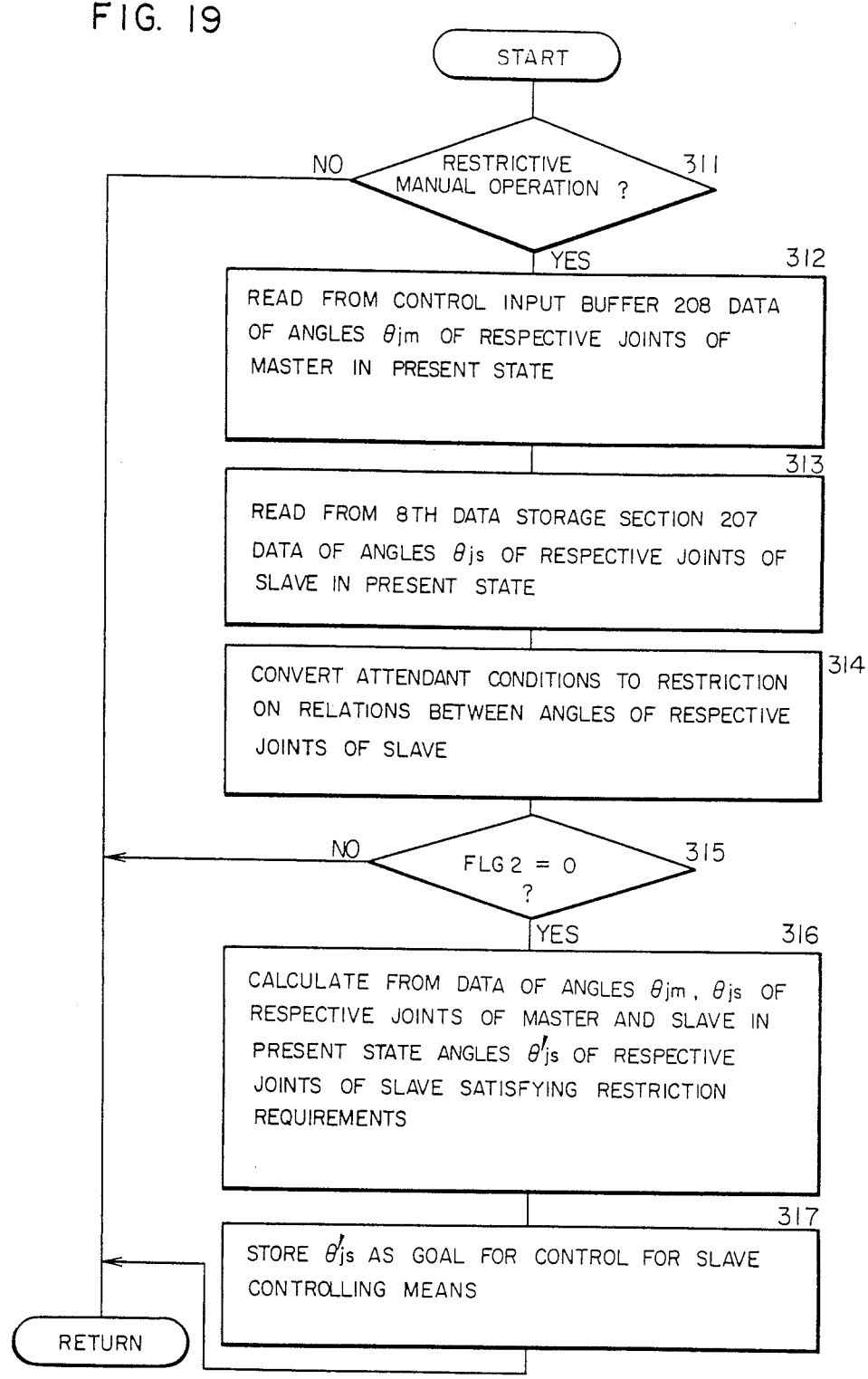

The most characteristic point of the slave managing processor means 105 is the operation with the attendant conditions in the manual operation mode, namely, the restrictive manual operation mode. FIG. 19 shows a detailed embodiment of the processing blocks 105p–105s of FIG. 18. In FIG. 21, the operation is first checked to see whether or not the operation is the restrictive manual operation (processing block 311). If this is the case, the angle data $\theta_{jm}$ of each joint of the master in the present state and the angle data $\theta_{js}$ of each angle of the slave are read from the control input buffer 208 and the 8th data storage section 207, respectively (processing blocks 312–313). The angle data $\theta_{jm}$ are beforehand written in the control input buffer 208 through the interface processor means 103. Next, based on the specified conditions, the respective attendant conditions are converted into relationships between the joint angles of the slave satisfying the attendant conditions (processing block 314). As already described in conjunction with FIG. 18, there may exist a case where the human operator of the master causes generation of an indication to release the restrictive conditions for the manual operation, which is judged depending on the value of FLG2="1" or "0" (processing block 315). If the indication to release the restrictive conditions is not present (FLG2=0), based on the angle data $\theta_{jm}$ and $\theta_{js}$ of the joints of the master and slave in the present state, the joint angles $\theta_j$'s of the slave satisfying the attendant conditions are calculated (processing block 316). The resultant data $\theta_j$'s are written in the 7th data storage section 206 as the control goal values of the slave managing processor means of FIG. 2 (processing block 317). Various processing shown in FIGS. 18–19 is executed at an interval of control (for example, 5-10 ms) to accomplish the master-slave operation and the automatic operation.

Figure 20:
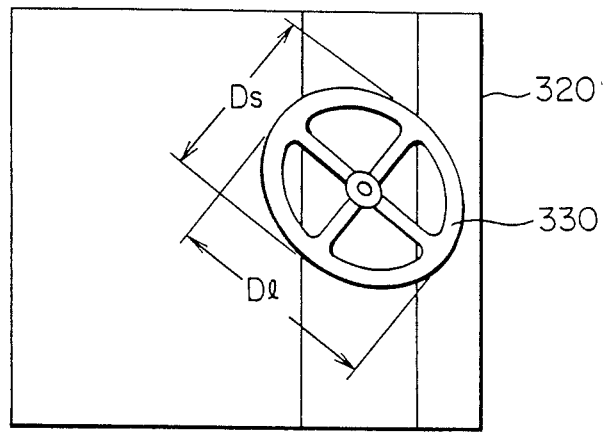
FIGS. 20, 21A, and 21B are schematic diagrams showing an operation example of the slave managing processor means.
Figures 21A, 21B:
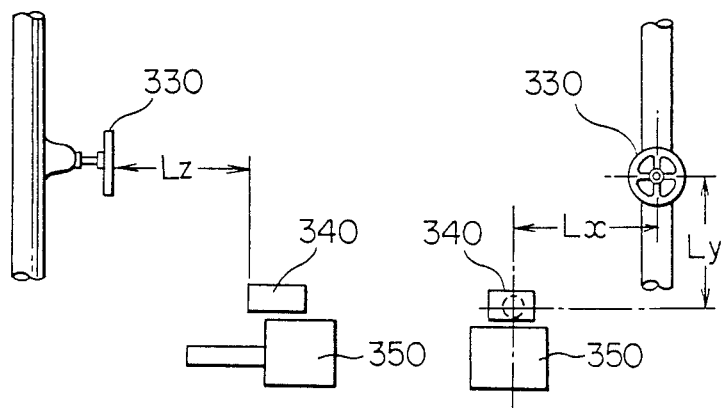

The slave management processor means 105 may be provided with a slave operation supporting function based on the feedback of sensed information to be described later in addition to the restrictive manual operation described above. FIGS. 20, 21A, and 21B show an embodiment of a case where the gripper of the slave is guided according to the image information. As an example of a handle operation of the valve, a description will be given of an aid operation in a course of the operation to grip the object of operation (valve handle) in the image data shot by a TV camera 340 installed at the gripper 350 of the slave manipulator. Assume that the valve handle has a known size and a complete roundness, then the distance and direction from the TV camera 340 to the valve handle (defined by $L_z$ of FIG. 21A and $L_x$ and $L_y$ of FIG. 21B) can be calculated by extracting the major axis, the minor axis, and the size of the ellipse from the image data of the valve handle on the image. Consequently, when a force is generated for the master in a direction so as to approach the object undergoing work and supplies the operation direction to the human operator, an operation to access the work object can be implemented in a short period of time.

<Embodiment for automatically evaluating the human operator's skill>

Figure 22:
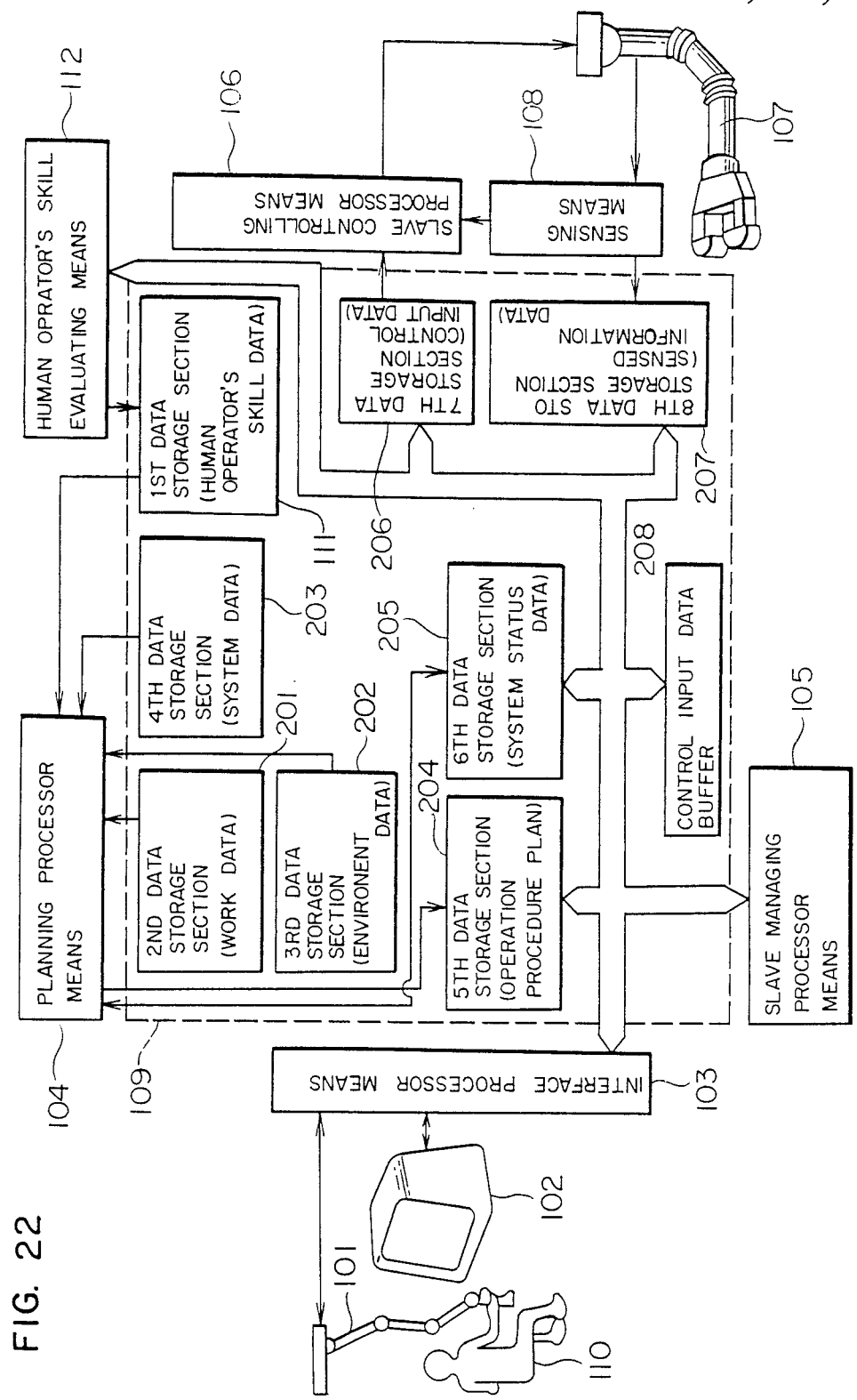
FIG. 22 is a block diagram illustrating another embodiment of the present invention having means for evaluating the skill of the human operator.

In the foregoing description, the skill data of the human operator is fixedly stored in the 1st data storage section 111 (FIG. 2); however, in the following paragraphs, as shown in the embodiment of FIG. 22, a description will be given of a method in which the skill data can be automatically generated and updated by use of the human operator's skill evaluating means 112.

Figure 23:
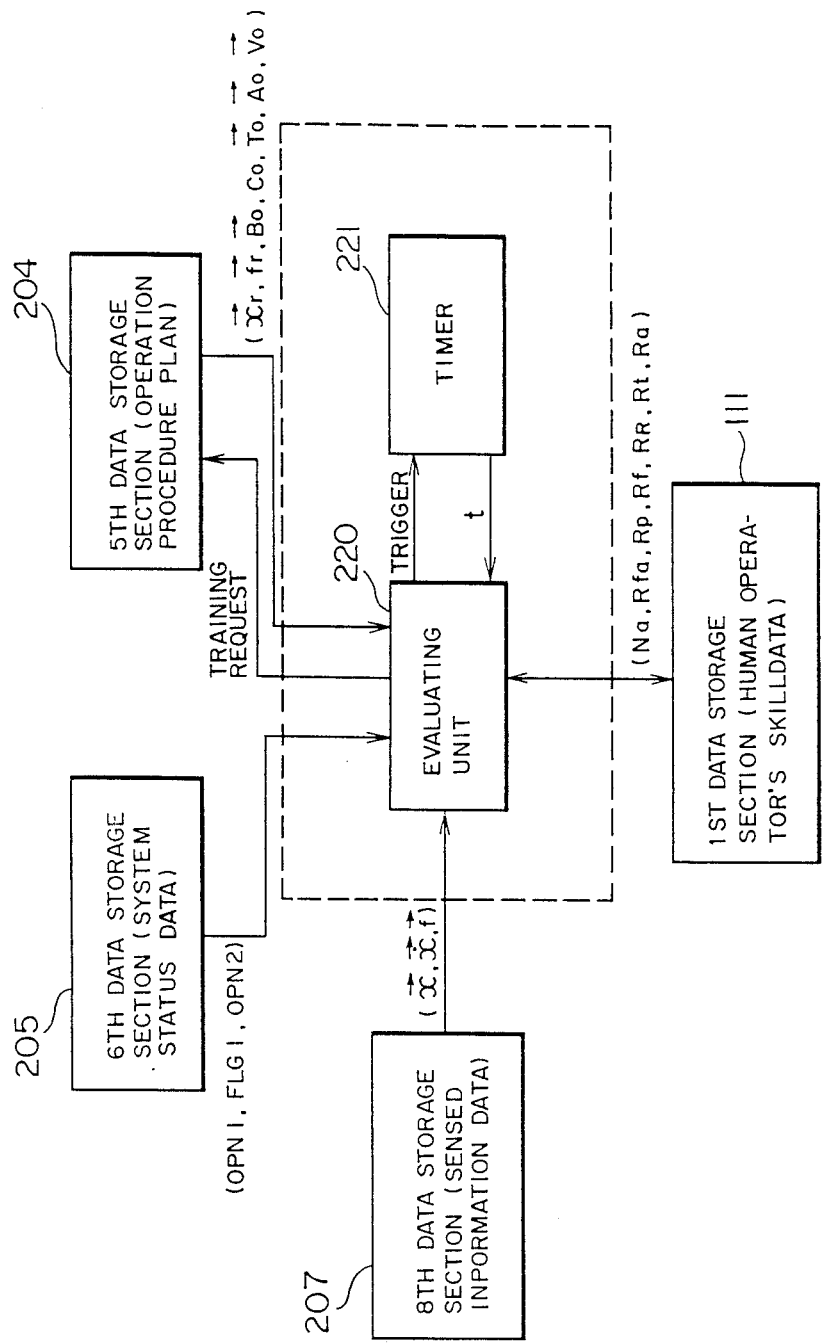
FIG. 23 is a block diagram illustrating the operator's skill evaluating means of FIG. 22.

The configuration of the human operator's skill evaluating means 112 will be described with reference to FIG. 23. The human operator's skill evaluating means 112 includes an evaluating unit 220 and a timer 221. The timer 221 receives a trigger ON signal from the evaluating unit 220, measures a period of time t (work time or positioning time), and transfers the time to the evaluating unit 220. The evaluating unit 220 receives data from the 5th data storage section 204 storing the plan, the 6th data storage section 205 storing the present status, the 8th data storage section 207 storing the sensed information, and the 1st data storage section 111 storing the human operator's skill data and then returns the results of calculations to the human operator's skill data field of the 1st data storage section 111.

The evaluating unit 220 reads the current values of the operation $\vec{x}$, velocity $\dot{\vec{x}}$, and $\vec{f}$ of the slave gripper from the 8th data storage section 207, where $\vec{x}$, $\dot{\vec{x}}$, and $\vec{f}$ are represented as follows.

$$\left. \begin{array}{l} \vec{x} = (x_x, x_y, x_z, \alpha, \beta, \gamma) \\ \dot{\vec{x}} = (\dot{x}_x, \dot{x}_y, \dot{x}_z, \dot{\alpha}, \dot{\beta}, \dot{\gamma}) \\ \vec{f} = (f_x, f_y, f_z, T_x, T_y, T_z) \end{array} \right\} \quad (1)$$

where, $x_x, x_y, x_z$: x, y, and z components of the tip position of the slave grip $\alpha, \beta, \gamma$ :direction cosine of attitude of hand $\dot{x}_x, \dot{x}_y, \dot{x}_z$: x, y, and z components of the tip position of manipulator hand $\dot{\alpha}, \dot{\beta}, \dot{\gamma}$ : angular velocity of direction cosine of attitude of slave $f_x, f_y, f_z$: x, y: and z components of force applied to hand $T_x, T_y, T_z$: moment components about x, y, and z axes on the slave The evaluating unit 220 reads from the 6th data storage section the number of operator currently executed OPN1 3a, the execution completion flag FLG1 3b, and the number of operator to be executed next OPN2 3c (FIG. 3).

Using the number of operator currently executed OPN1 3a, the evaluating unit 220 reads from the 5th data storage section 204 data for the human operator's skill, namely, the task data ($\vec{x}_r, \vec{f}_r, B_o, C_o, T_o, A_o, V_o$).

The task data will be here described.

The evaluating means 220 reads from the 5th data storage section 204 data of the reference time $T_o$ for performing task, carrying distance $A_o$, and reference carrying speed $V_o$. The reference time $T_o$ for performing task is a period of time required for a job (to be referred to as a task herebelow) at the trajectory level 8e. $A_o$ stands for a distance between the position of slave $x_o$ immediately before the start of task and the goal position $x_r$ of the slave in the task (for example, corresponding to $\vec{x}_4$ of FIG. 8F).

The reference carrying speed $V_o$ is the reference speed of the slave when moved to the goal position $\vec{x}_r$ within the specified trajectory allowance $C_o$. The evaluating unit 220 further reads from the 5th data storage section 204 the goal value $\vec{x}_r$ of position, the goal value $\vec{f}_r$ of force, the positioning allowance value $B_o$, and the allowance for trajectory following $C_o$.

The dimensions of $\vec{x}_r$ and $\vec{f}_r$ are identical to those (=6) of $\vec{x}$ and $\vec{f}$ represented by expression (1).

Here, $\vec{x}_r$ is the same as $\vec{x}_i$ at the trajectory level (FIG. 8F), and $f_r$ is determined by cond$_i$ of FIG. 8G (for example, a force at least 10 N is applied to an object of task). The allowance for positioning $B_o$ has the same dimension as that of $\vec{x}$, indicates the allowance when the positioning is conducted on the goal position $\vec{x}_r$, and is specified by cond$_i$ at the trajectory level. The allowance for trajectory following $C_o$ is specified by cond$_j$ to indicate the allowance of the trajectory following error when the trajectory condition is specified in cond$_i$.

FIGS. 24–25 show input/output relationships between the human operator's skill evaluating means 112 and external means.

Figure 27:
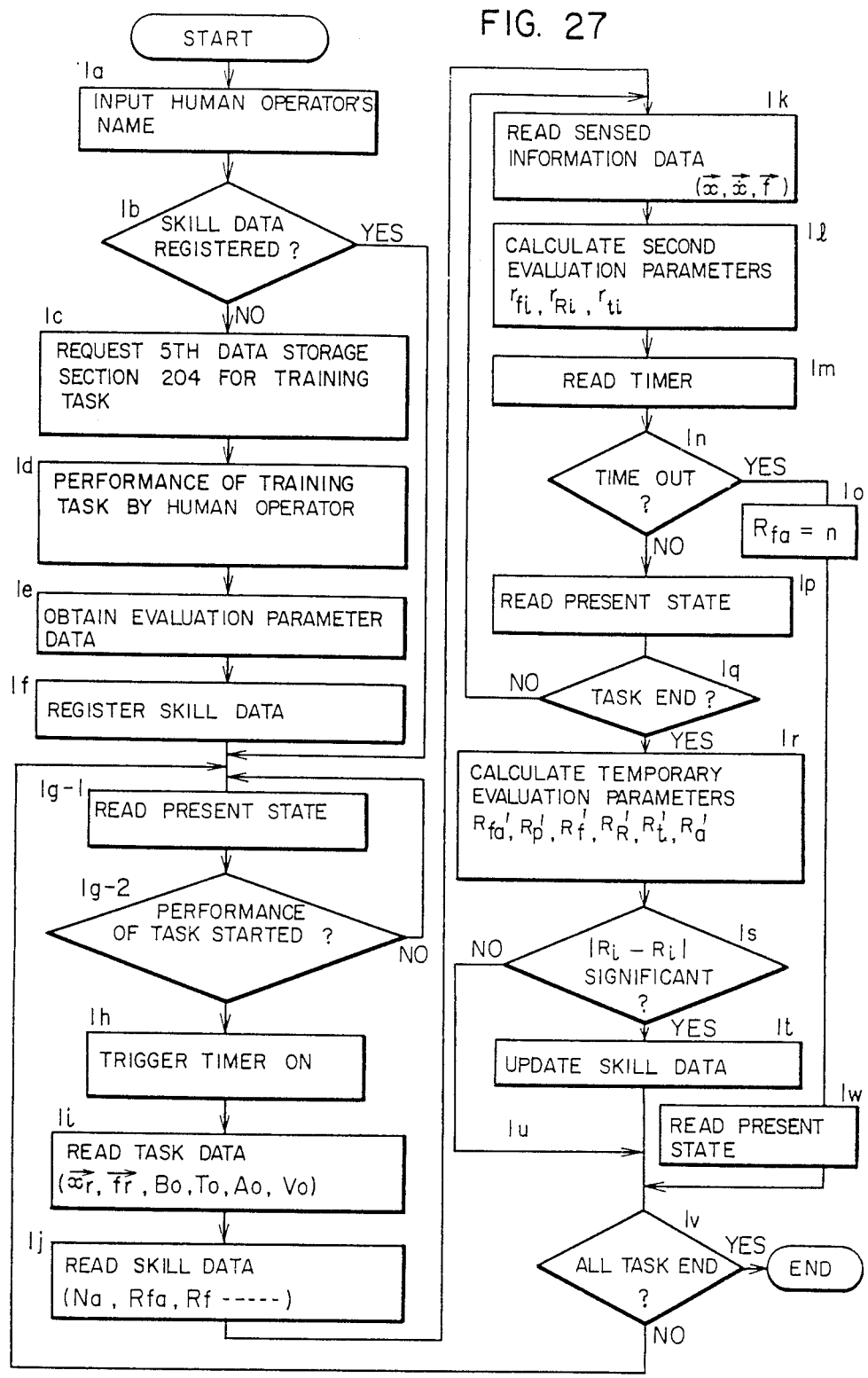
FIG. 27 is a flowchart for explaining the fundamental principle of the operator's skill evaluating means.

FIG. 27 is a flowchart illustrating the principle of operations of the evaluating means 220. The description will be given with reference to FIG. 27. In this flowchart, the procedures from 1a to 1f are conducted once when the human operator initiates the use of this remote manipulation system; whereas the procedures after 1f to 1v may be repetitively executed in the form of a large loop in order to update skill data during all operations. Thus, changes in the skill of a human operator due to fatigue or the like appear as changes in the skill data in a real-time, and these changes will affect results of instatiation process for the operation procedure plans that are not executed yet.

The details of skill evaluating operations will be described herebelow.

The human operator inputs his or her name from a keyboard or the like through the interface processor means 103 (1a).

The evaluating unit 220 effects a check to determine whether or not the name of the human operator has already been registered to the 1st data storage section 11 (1b). If the name has been registered, the following processing (1c–1f) is skipped.

A training job is then requested to the 5th data storage section 204. In the training job, appropriate goal position $\vec{x}_r$ and allowance for positioning $\vec{B}_o$ are displayed on the TV monitor 102 via the interface processor means 103 so as to ask the human operator 110 to position the slave at the goal position $\vec{x}_r$ within the positioning allowance $B_o$ by use of the manipulator 101.

The evaluating unit 220 calculates the distance of movement $A_o$ between the starting point and the goal point and measures the time t required to achieve the positioning of the slave 107 at the goal position $\vec{x}_r$ within the allowance for positioning $B_o$ after the positioning is started.

For $A_o$ and $B_o$, data of several points are beforehand prepared to enable $\log_2 |A|$ and $\log_2 |B|$ to cover 3–4 ranges, thereby measuring the positioning time for the data of several points. Using the results of these operations, the basic evaluation parameters Ra and Rp are determined (1e) from the regression line $$t = Ra + Rp \cdot \log_2 A/B$$

of the positioning time t for the parameters $\log_2 A/B$ ($A = |A|$, $B = |B|$) representing the degree of difficulty of the positioning. The evaluation parameters Ra and Rp are registered to the 1st data storage section 111 together with the name of the human operator (1f). This is followed by processing to update the skill data of the human operator registered thereto.

Next, the evaluating unit 220 reads data (OPN1, FLG1, OPN2) from the 6th data storage section 205 (1g-1).

The evaluating unit 220 judges whether or not the task execution has been started as follows.

FLG1=0: The task is in the wait state.
FLG1=1: The task is being executed.

When the FLG1 is "0", the task is in the wait state, which continues until the FLG1 is changed to be "1". For FLG1=1, control proceeds to the next step (1g-2).

The evaluating unit 220 then supplies the trigger ON signal to the timer 221 to start the measurement thereof (1h).

Next, the evaluating unit 220 reads from the plan section 204 task data ($\vec{x}_r$, $\vec{f}_r$, $B_o$, $C_o$, $T_o$, $A_o$, $V_o$) based on the number of task currently executed OPN1.

The evaluating unit 220 then reads the skill data ($N_a$, $R_{fa}$, $R_p$, $R_f$, $R_t$, $R_a$, ...) of the human operator (1j).

Next, the evaluating unit 220 reads data $\vec{x}$, $\dot{\vec{x}}$, and f from the 8th data storage section 207 (1k).

The evaluating unit 220 then conducts calculations with the second evaluation parameters $r_{fi}$, $r_{Ri}$, and $r_{ti}$ as follows.

$$r_{fi} = |f_r - f_i|/f_r$$

$$r_{Ri} = |x_r - x_i|$$

$$r_{ti} = |\dot{x}_i|/V_o$$

where, x is the norm of the vector x (1l).

Subsequently, the evaluating means 220 reads the time t from the timer 221 (1m) and then judge whether or not a time-out has occurred by comparing t with $T_o$ (1n).

For $t \geq n\, T_o$, a time-out is assumed, the fatigue parameter $R_{fa}$ is set to n(1o), and the evaluating unit 220 reads the data OPN1 FLG1, and OPN2 from the 6th data storage section 205 and skips the processing steps 1p–1t. The state of time-out corresponds to a case where the specific work time is exceeded because the human operator is fatigued, and an appropriate value is set to n depending on the content of the task. The value of n is 2 or 3 in ordinary cases.

For $t < n\, T_o$, the evaluating unit 220 reads the data OPN1, FLG1, and OPN2 from the 6th data storage section 205 (1p).

The evaluating unit 220 then judges whether or not the task has been finished by use of the FLG1. For FLG1=1, the task is judged to be under execution and control returns to the processing 1k; whereas for FLG1=0, the end of task is assumed and control is passed to processing 1r (1q).

Next, the evaluating unit 220 calculates the temporary values $R_{fa}'$, $R_p'$, $R_f'$, $R_R'$ of the evaluation parameters by use of the following formulas (1r).

$$R_{fa}' = (t - T_o)/T_o$$

$$R_p' = (t - R_o)/(\ln 2A_o/B_o)$$

$$R_f' = \overline{r_{fi}} \text{ (average)}$$

$$R_R' = \overline{r_{ri}} \text{ (average)}$$

$$R_t' = \overline{r_{ti}} \text{ (average)}$$

The evaluating unit 220 then judges whether or not $|R_i - R_i'|$ results in a significant difference. If this is the case, the processing 1t is executed; otherwise, the processing 1t is skipped (1s). The judgment of the significant difference is made with respect to $\epsilon_i$, namely, the difference is assumed to be insignificant for a case $|R_i - R_i'| < \epsilon_i$. The value of $\epsilon_i$ is a fixed value beforehand stored in the evaluating unit 220.

In the processing 1t, the skill data for which the significant difference is found is updated and the skill update flag indicating the updated skill data is set to 1, so that the updated skill data can be readily discriminated by other means.

Figure 28:
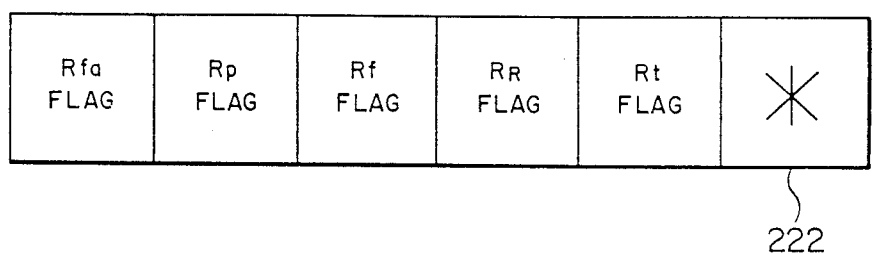
FIG. 28 is an explanatory diagram of parameters.

Incidentally, the skill data update flag is of the configuration of FIG. 28.

Next, whether or not all tasks have been finished is judged by use of the OPN2 3c. If all tasks have been completed (OPN2=0), the evaluating unit 220 completes all operations; otherwise (OPN2≠0), control returns to the processing 1g.

FIG. 26 shows the formulas for the evaluation parameters.

Figure 29:
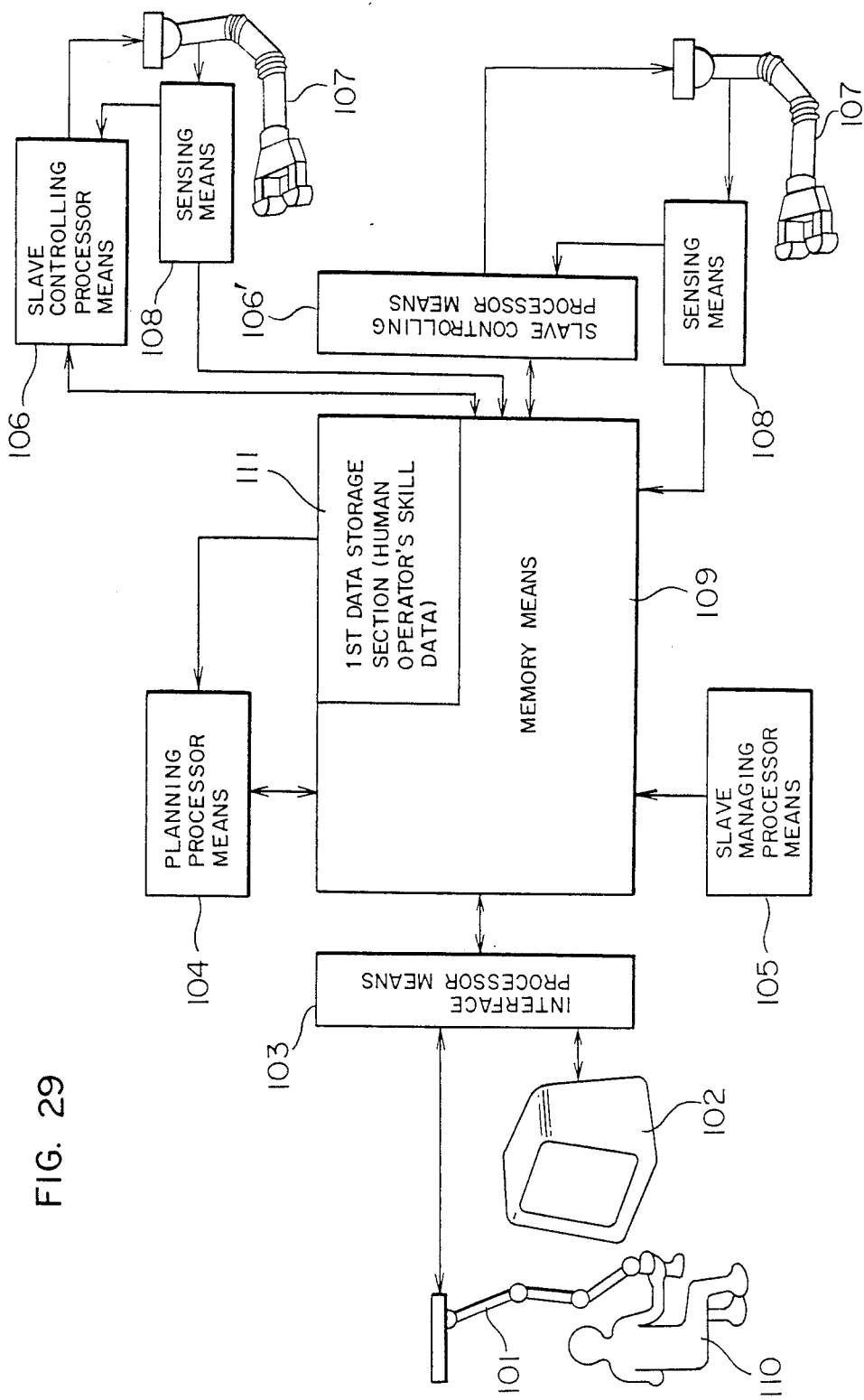
FIG. 29 is a block diagram illustrating another embodiment of the present invention.

When the function and speed of computers are improved, the sensing technology and the image processing technology will be further developed, and hence it is forecasted that the ratio of the automatic operation is increased. In this case, the time for the human operator to operate the master is reduced and the free time is provided, which may allow a human operator to operate a plurality of slaves. FIG. 29 shows an embodiment of such a case. As shown in this diagram, two slaves 107 and 107' are operated through a master handled by a human operator. The information of the monitor 102 is converted into the information of the slave requiring the manual operation and is used to guide the operation of the corresponding slave for the human operator 110. The human operator 110 can operate the slave requiring the manual operation by handling the master 101. In this case, the memory means 1090 is configured in the multilayer structure corresponding to the respective slaves. This method is similarly applicable even when the number of slaves exceeds two.

While the present invention has been described with reference to the particular illustrative embodiments, it is not to be restricted by those embodiments but only the appended claims. It is to be appreciated that those skilled in the art can change or modify the embodiments without departing from the scope and spirit of the present invention.

We claim:

1. A remote manipulation method for performing work including a sequence of operational steps using a manually operable master device and a slave device operable in response to said master device and a programmable control means coupled between said master device and said slave device, comprising the steps of:
   producing an operation procedure plan on the basis of data indicating a level of skill of a human operator and data indicating a goal for work to be performed, said plan including a combination of manual operations and automatic operations allocated according to said level of skill of the human operator;
   programming said control means in accordance with said plan so that each of said operational steps is defined as being carried out by manual operation of said master by said human operator and/or by automatic operations defined by commanding data produced by said control means; and
   actuating said slave by carrying out said manual operations in response to actuation of said master device by said human operator and by carrying out said automatic operations under control of said control means in accordance with said plan.

2. A method according to claim 1, further comprising the steps of updating the data indicating the level of skill of human operator in the course of manual operations of said master device and evaluating said level of skill of said human operator.

3. A method according to claim 2, further comprising the step of updating said operation procedure plan upon said updating of said data indicating the level of skill of the operator.

4. A remote manipulation system having a manually operable master device and a slave device responsive to both manual operation of the master device by a human operator and automatic operation defined by commanding data for performing work including a sequence of operational steps, the system comprising:
   planning means for producing an operation procedure plan on the basis of data indicating a level of skill of a human operator and data indicating a goal for work to be performed, said plan including a combination of manual operations and automatic operations allocated according to said level of skill of the human operator and in which each of said operational steps is defined as being carried out by manual operations of said master device or by automatic operations defined by commanding data;
   slave managing means coupled to said master device and said planning means for controlling said slave device to carry out said manual operations in response to actuation of said master device by said human operator and automatic operations in said plan; and
   interface means coupled between said master device and said slave managing means for providing information on an operational step in said plan to be carried out by manual operation.

5. A system according to claim 4, further comprising memory means for storing said human operator skill level data and said plan.

6. A system according to claim 5, further comprising evaluating means coupled to said memory means for evaluating the skill level of said human operator.

7. A system according to claim 4, in which said interface means includes means for displaying on a display screen an actual image of an object undergoing said work, an actual image of a gripper of said slave device and task items for an operational step to be carried out.

8. A system according to claim 7, in which said interface means further includes means for displaying a position of a goal of the gripper and attendant conditions representative of information for limiting actuation of said slave by said manual operation.

9. A remote manipulation method for performing work including a sequence of operational steps using a manually operable master device and a slave device, comprising the steps of:
   preparing an operation procedure plan in which each of said operational steps is defined as being performed by manual operation of the master device or automatic operation defined by operators of commanding data, including determining whether each operational step is to be performed by manual operation or automatic operation at least on the basis of information on the level of skill of a human operator; and actuating said slave device in accordance with said manual operations and automatic operations in said operational procedure plane for performing said operational steps, whereby work is performed efficiently with the level of skill of a human operator taken into consideration.

10. A method according to claim 9, further comprising the step of updating said operation procedure plan depending upon changes of the level of skill of said human operator in the course of performance of said sequence of operational steps.

11. A remote manipulation system having a manually operable master device and a slave device responsive to both manual operation of the master device by a human operator and automatic operation defined by operators of commanding data for performing work including a sequence of operational steps, the system comprising:

memory means;

means for preparing an operation procedure plan in which each of said operational steps is defined as being performed by manual operation of the master device or automatic operation of commanding data, including means for determining whether each operational step is to be performed by manual operation or automatic operation at least on the basis of information on the level of skill of the human operator, and means for storing said plan in said memory means;

means associated with said memory means and said master device for managing said manual operations;

means associated with said memory means for managing said automatic operations; and slave control means responsive to the outputs of said manual operation managing means and said automatic operation managing means for actuating said slave device in accordance with said manual operations and automatic operations designated by said operation procedure plan for performing said work.

12. A system according to claim 11, further comprising means associated with said memory means for updating said operation procedure plan depending upon changes of the level of skill of said human operator in the course of performance of said sequence of operational steps.

13. A system according to claim 11, further comprising means for sensing behavior of said slave device and supplying said memory means with information on the current status of said slave device.

* * * * *